(12) United States Patent
Lee et al.

(10) Patent No.: US 11,068,900 B2
(45) Date of Patent: Jul. 20, 2021

(54) ELECTRONIC DEVICE AND ELECTRONIC PURCHASE METHOD USING SAME

(71) Applicant: Samsung Electronics Co., Ltd., Gyeonggi-do (KR)

(72) Inventors: Jung-Jik Lee, Gyeonggi-do (KR); Hye-Rim Bae, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 643 days.

(21) Appl. No.: 15/856,376

(22) Filed: Dec. 28, 2017

(65) Prior Publication Data

US 2018/0197177 A1 Jul. 12, 2018

(30) Foreign Application Priority Data

Jan. 12, 2017 (KR) .......................... 10-2017-0005633

(51) Int. Cl.
*G06Q 20/40* (2012.01)
*G06Q 20/32* (2012.01)
(Continued)

(52) U.S. Cl.
CPC ....... *G06Q 20/405* (2013.01); *G06F 3/04842* (2013.01); *G06Q 20/3226* (2013.01);
(Continued)

(58) Field of Classification Search
CPC ........ G06Q 40/00; G06Q 30/00; G06Q 10/00; G06Q 20/405; G06Q 20/3226;
(Continued)

(56) References Cited

U.S. PATENT DOCUMENTS 8,280,776 B2 * 10/2012 Coulter .................. G06Q 20/02
705/16
8,412,626 B2 * 4/2013 Hirson .................. H04L 63/083
705/39
(Continued)

FOREIGN PATENT DOCUMENTS

JP 2003-223600 A 8/2003

OTHER PUBLICATIONS

Colin Beasty, "Retailers are in Transition as They Balance Customer Experience in The Store and On The Web", Customer Relationship Management, Mar. 2006.*
(Continued)

*Primary Examiner* — Frantzy Poinvil
(74) *Attorney, Agent, or Firm* — Cha & Reiter, LLC

(57) ABSTRACT

Disclosed are an electronic device and method. The electronic device includes a display, a memory, and a processor. The processor executes the method, including storing in the memory a first electronic purchase history recording purchase of a first product, and associated first settlement information, displaying a user interface for a second purchase of the first product using at least one of the first electronic purchase history and the first settlement information, in response to receiving an input to the user interface, transmitting a request to execute a second purchase of the first product to an external server, and storing, in the memory, a second electronic purchase history and second settlement information corresponding to the second purchase.

18 Claims, 15 Drawing Sheets

(51) Int. Cl.
*G06F 3/0484* (2013.01)
*G06Q 30/06* (2012.01)
*G06K 9/00* (2006.01)
*G06F 3/0481* (2013.01)
*G06F 3/0482* (2013.01)
*G06F 3/0488* (2013.01)

(52) U.S. Cl.
CPC ..... *G06Q 20/3278* (2013.01); *G06Q 30/0603* (2013.01); *G06Q 30/0633* (2013.01); *G06Q 30/0641* (2013.01); *G06F 3/0482* (2013.01); *G06F 3/0488* (2013.01); *G06F 3/04817* (2013.01); *G06K 9/00671* (2013.01)

(58) Field of Classification Search
CPC ............ G06Q 20/3278; G06F 3/04842; G06F 3/04817; G06F 3/0482; G06F 3/0488; G06K 9/00671
USPC ...................................................... 705/3–44
See application file for complete search history.

(56) References Cited

U.S. PATENT DOCUMENTS

| | | | | |
|---|---|---|---|---|
| 8,688,539 | B2* | 4/2014 | Bamborough | G06Q 30/0239 705/26.1 |
| 8,744,923 | B1* | 6/2014 | McKay | G06Q 30/0264 705/26.1 |
| 9,123,071 | B1* | 9/2015 | McFarland | G06Q 30/0603 |
| 9,836,747 | B2* | 12/2017 | Borrero | G06Q 30/00 |
| 9,911,155 | B1* | 3/2018 | Gupta | G06Q 40/00 |
| 2008/0052188 | A1* | 2/2008 | Walker | G06Q 30/02 705/26.1 |
| 2008/0235123 | A1 | 9/2008 | Olliphant et al. | |
| 2012/0303531 | A1* | 11/2012 | Betancourt | G06Q 20/3278 705/44 |
| 2014/0095383 | A1* | 4/2014 | Rao | G06Q 20/385 705/43 |
| 2014/0156465 | A1 | 6/2014 | Muthu | |
| 2014/0365274 | A1* | 12/2014 | Fitzpatrick | G06Q 30/0226 705/7.29 |
| 2014/0379578 | A1* | 12/2014 | Chan | G06Q 20/322 705/44 |
| 2015/0032574 | A1* | 1/2015 | Calman | G06Q 30/0629 705/26.64 |
| 2015/0120509 | A1* | 4/2015 | Moring | G06Q 30/0635 705/26.81 |
| 2015/0278859 | A1* | 10/2015 | Sundaresan | G06Q 30/0255 705/14.53 |
| 2015/0302510 | A1* | 10/2015 | Godsey | G06Q 30/0635 705/26.81 |
| 2016/0012431 | A1* | 1/2016 | Proctor, Jr. | H04L 69/18 705/44 |
| 2016/0162971 | A1* | 6/2016 | Peterson | G06Q 30/0639 705/26.63 |
| 2017/0364889 | A1* | 12/2017 | Rastogi | G06Q 30/06 |
| 2018/0040023 | A1* | 2/2018 | Zhao | G06Q 30/0259 |
| 2018/0276640 | A1* | 9/2018 | Kohli | G07G 5/00 |
| 2020/0027154 | A1* | 1/2020 | Godsey | G06Q 10/087 |

OTHER PUBLICATIONS

Anand V. Bodapati, "Recommendation Systems with Purchase Data", Journal of Marketing Research, vol. XLV, pp. 77-93, Feb. 2008.*

* cited by examiner

| Item | Contents | Remarks |
|---|---|---|
| Payment API parameter info | Supported Methods | Info on payment methods<br>ex) Visa/Master/SamsungPay/AndroidPay. |
| | - Total Display Item<br>- Info on each item (Lable/Amount) | Total price info & items to be displayed,<br>Amount & price of each item to be purchased<br>ex)Total : "Sum", amount : 'USD', 55<br>Label : "T-shirt" amount: 'USD', 10<br>Lable : "Pants" amount: 'USD', 5 |
| | Shipping Options | ex) ID: 'shippingOption',<br>Label : 'World wide shipping',<br>Amount: USD, 10.0<br>Selected: true |
| Login page address info (URL) | Address info (URL) for input of login ID/PW | Store URL providing HTML ID/password form when login is successful<br>ex) https://nid.naver.com/nidlogin.login?url=http%3A%2F%2Fwww.naver.com/mobile |
| Info related to whether automatic login is successful | Check whether website allows automatic login | Represented as true when automatic login is allowed<br>Represented as false when automatic login is not allowed |
| Address info (URL) for checking whether product is purchasable | URL for checking whether product is site purchasable on | - When payment API parameter is delivered in JSON format, allows check for whether product is purchasable or price info has been changed, & allows payment API parameter to be retransmitted in same JSON format<br>- In order to know this URL, meta tag is added to settlement screen<br>ex)<meta name="samsung-payment-api-validation" content="http://myg.gmarket.co.kr/payment_validation/validation"> |
| Item-to-be-recommended search address info (URL) | URL for searching for product to be recommended when product desired to be purchased is out of stock | In order to know URL for searching for product to be recommended, site page needs to have meta tag added thereto<br>ex)<meta name="samsung-payment-recommend-items" content="http://gmarket.co.kr/payment_search/recommend"> |
| Info related to extension of physical web or NFC | Meta tag for extension of Bluetooth/NFC | - Assign unique ID<br>- Provide assigned ID on settlement screen through meta tag<br>ex) <meta name="Samsung-payment-nfc-id" content="URL_ID_SHOPPING_ITEM"><br><meta name="samsung-payment-physical-web" content="00112233445566778899AABBCCDDEEFF"> |

FIG.7

```
function buy() { // eslint-disable-line no-unused-vars
  try {                                                    801
    var request = new PaymentRequest(
      [{supportedMethods: ['visa']}], {
        total: {label: 'Total', amount: {currency: 'USD', value: '5.00'}},
        shippingOptions: [{
          id: 'freeShippingOption',
          label: 'Free global shipping',
          amount: {currency: 'USD', value: '0'},
          selected: true
        }]
      },
      {requestShipping: true});
    request.show()
      .then(function(resp) {
        resp.complete('success')
          .then(function() {
            print(
              resp.shippingOption + '<br>' +
              JSON.stringify(
                toDictionary(resp.shippingAddress), undefined, 2) +
              '<br>' + resp.methodName + '<br>' +
              JSON.stringify(resp.details, undefined, 2));
          })
          .catch(function(error) {
            print(error.message);
          });
      })
      .catch(function(error) {
        print(error.message); });
  } catch (error) {
    print(error.message);
  }
}
```

FIG.8

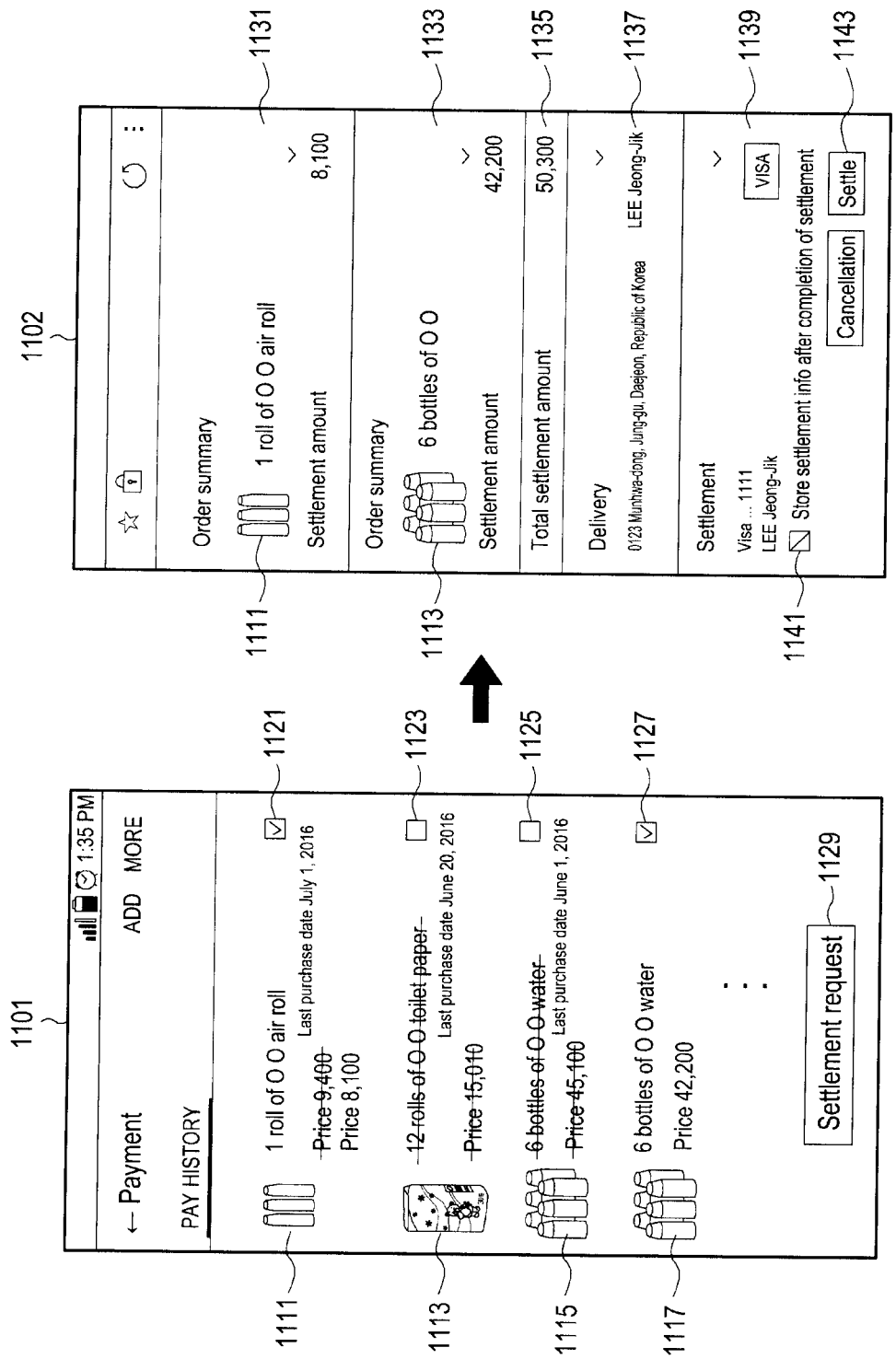

ELECTRONIC DEVICE AND ELECTRONIC PURCHASE METHOD USING SAME

CLAIM OF PRIORITY

This application claims the priority under 35 U.S.C. § 119(a) to Korean Patent Application Serial No. 10-2017-0005633, which was filed in the Korean Intellectual Property Office on Jan. 12, 2017, the entire content of which is hereby incorporated by reference.

TECHNICAL FIELD

The present disclosure relates to an electronic device and an electronic purchase method using the same.

BACKGROUND

With the advancement of Internet technology, commercial transactions conducted offline can also be conducted through the Internet (e.g., online), and electronic commerce, which allows the trade of products through a shopping site accessible on the Internet, is now widely used. A consumer can visit an Internet shopping site and conveniently purchase various articles or products provided by a seller.

Various electronic purchase technologies have been developed to enable consumers to conveniently purchase products through such Internet electronic commerce.

SUMMARY

Due to allowing easy and convenient purchase of products, a significantly large number of shopping sites of various forms have been created, and currently-existing shopping sites provide different electronic purchase methods according to respective payment schemes, but no overarching standard exists.

Typically, an electronic purchase method for Internet shopping broadly refers to technology allowing an electronic device capable of using the Internet to: process an order for purchasing a product obtained by performing a search on a shopping site; process payment for the ordered product; and when the payment has been completed, deliver the product to a place desired by a user.

For example, an electronic device is capable of: accessing a website (shopping site) for purchasing a product; allowing a user to select a product through a search for pieces of web information provided by the website through a web browser (program); moving to a purchase page to order the selected product; and enabling immediate purchasing of the ordered product, or purchasing of the ordered product after placing the product in a shopping basket. When the electronic device receives, from the user, a request for purchase of the selected product through a purchase button of the purchase page or a shopping basket page, the electronic device is capable of: installing or executing a settlement application in order to process settlement of the ordered product; displaying a login page; and when receiving login information (ID and password) as an input from the user and then logging in to the website, moving to and displaying a settlement screen for paying the cost of the product. Thereafter, when the user presses a settlement button on a settlement page, the electronic device is capable of: performing an operation for payment settlement and approval; and when the settlement has been completed, moving to and displaying a settlement completion page.

However, the conventional electronic purchase method causes inconvenience in that the same operations according to a typical electronic purchase method needs to be repeatedly performed even when a product is repeatedly purchased.

Various embodiments of the present disclosure can provide an electronic device and a purchase method using the same which allow easy and convenient purchase of a product frequently purchased on a website providing an Internet shopping service.

In one aspect of this disclosure, an electronic device is disclosed. The electronic device may include a display, a memory, and a processor electrically coupled to the display and the memory, configured to: store in the memory a first electronic purchase history recording purchase of a first product, and associated first settlement information, control the display to display a user interface for a second purchase of the first product using at least one of the first electronic purchase history and the first settlement information, in response to receiving an input to the user interface, transmit a request to execute a second purchase of the first product to an external server, and store, in the memory, a second electronic purchase history and second settlement information corresponding to the second purchase.

In one aspect of this disclosure, a method in an electronic device is disclosed. The method includes storing in a memory a first electronic purchase history recording purchase of a first product, and associated first settlement information, controlling a display by a processor to display a user interface for a second purchase of the first product using at least one of the first electronic purchase history and the first settlement information, in response to receiving an input to the user interface, transmitting by a communication module a request to execute a second purchase of the first product to an external server; and storing, in the memory, a second electronic purchase history and second settlement information corresponding to the second purchase.

In one aspect of this disclosure, a computer-readable recording medium recording a program for executing on a computer, the program comprising executable instructions that, when executed by a processor, cause the processor to perform operations comprising storing in a memory a first electronic purchase history recording purchase of a first product, and associated first settlement information, controlling a display by a processor to display a user interface for a second purchase of the first product using at least one of the first electronic purchase history and the first settlement information, in response to receiving an input to the user interface, transmitting by a communication module a request to execute a second purchase of the first product to an external server, and storing, in the memory, a second electronic purchase history and second settlement information corresponding to the second purchase.

The electronic device and the purchase method using the same according to various embodiments of the present disclosure allow easy and convenient purchase of a frequently-purchased product provided by a website providing an Internet shopping service.

BRIEF DESCRIPTION OF THE DRAWINGS

The above and other aspects and features of the present disclosure will be more apparent from the following detailed description taken in conjunction with the accompanying drawings, in which:

FIG. 7 is a view illustrating an example of settlement information stored in an electronic device according to various embodiments of the present disclosure;

FIG. 8 is a view illustrating an example of a payment Application Program Interface (API) for an electronic purchase according to various embodiments of the present disclosure;

FIG. 11A and FIG. 11B are views illustrating examples of a user interface in an electronic purchase operation according to various embodiments of the present disclosure;

FIG. 12A and FIG. 12B are views illustrating examples of a webpage in an electronic purchase operation according to various embodiments of the present disclosure;

DETAILED DESCRIPTION

Figure 1:
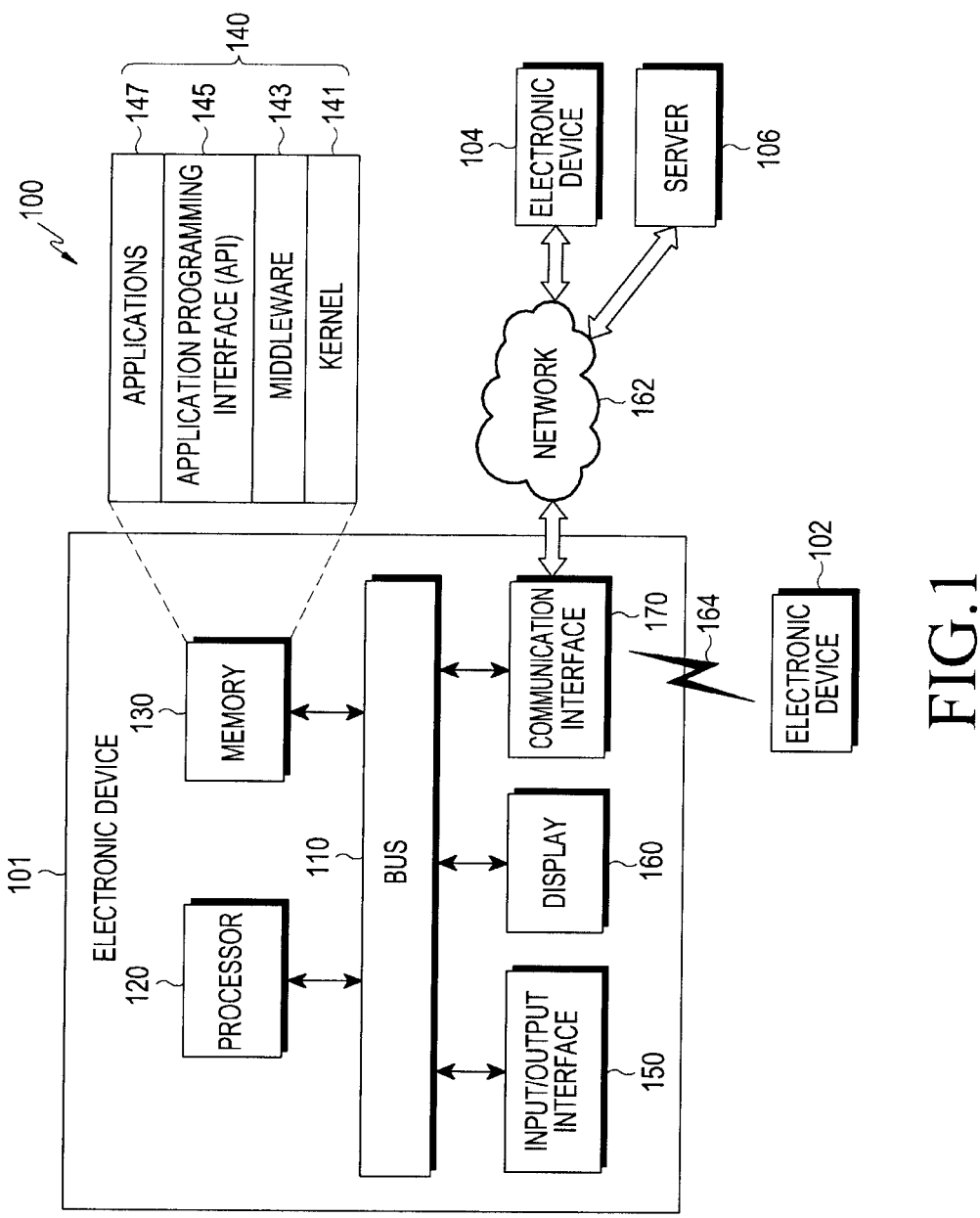
FIG. 1 is a view illustrating a network environment according to various embodiments of the present disclosure.

Hereinafter, various embodiments of the present disclosure will be described with reference to the accompanying drawings. It should be understood that the embodiments and the terms used herein are not intended to limit the present disclosure to the particular forms disclosed and the present disclosure aims to cover various modifications, equivalents, and/or alternatives of the corresponding embodiments. In describing the drawings, similar reference numerals may be used to designate similar elements. As used herein, the singular forms may include the plural forms as well, unless the context clearly indicates otherwise. In the present disclosure, the expression "A or B" or "at least one of A and/or B" may include all possible combinations of the items listed.

The expression "a first", "a second", "the first", or "the second" may modify corresponding elements regardless of the order or the importance, and is used only to distinguish one element from another element, but does not limit the corresponding elements. When an element (e.g., first element) is referred to as being (operatively or communicatively) "connected" or "coupled," to another element (e.g., second element), the element may be connected directly to the another element or connected to the another element through any other element (e.g., third element).

In the present disclosure, the expression "configured to" may be exchanged with, for example, "suitable for", "having the capacity to", "adapted to", "made to", "capable of", or "designed to" in terms of hardware or software, according to circumstances. In some situations, the expression "device configured to" may mean that the device, together with other devices or components, "is able to". For example, the phrase "processor adapted (or configured) to perform A, B, and C" may mean a dedicated processor (e.g. embedded processor) for performing the corresponding operations or a general-purpose processor (e.g., Central Processing Unit (CPU) or Application Processor (AP)) that can perform the corresponding operations by executing one or more software programs stored in a memory device.

An electronic device according to various embodiments of the present disclosure may include at least one of, for example, a smart phone, a tablet Personal Computer (PC), a mobile phone, a video phone, an electronic book reader (e-book reader), a desktop PC, a laptop PC, a netbook computer, a workstation, a server, a Personal Digital Assistant (PDA), a Portable Multimedia Player (PMP), an MPEG-1 audio layer-3 (MP3) player, a medical device, a camera, and a wearable device. According to various embodiments of the present disclosure, the wearable device may include at least one of an accessory type (e.g., a watch, a ring, a bracelet, an anklet, a necklace, glasses, a contact lens, or a Head-Mounted Device (HMD)), a fabric- or clothing-integrated type (e.g., an electronic clothing), a body-mounted type (e.g., a skin pad or tattoo), and a bio-implantable type (e.g., an implantable circuit). According to some embodiments of the present disclosure, the electronic device may include at least one of, for example, a television, a Digital Video Disk (DVD) player, an audio player, a refrigerator, an air conditioner, a vacuum cleaner, an oven, a microwave oven, a washing machine, an air cleaner, a set-top box, a home automation control panel, a security control panel, a media box (e.g., Samsung HomeSync™, Apple TV™, or Google TV™), a game console (e.g., Xbox™ and PlayStation™), an electronic dictionary, an electronic key, a camcorder, and an electronic photo frame.

According to another embodiment of the present disclosure, the electronic device may include at least one of various medical devices (e.g., various portable medical measuring devices (a blood glucose monitoring device, a heart rate monitoring device, a blood pressure measuring device, a body temperature measuring device, etc.), a Magnetic Resonance Angiography (MRA) device, a Magnetic Resonance Imaging (MRI) device, a Computed Tomography (CT) machine, and an ultrasonic machine), a navigation device, a Global Navigation Satellite System (GNSS), an Event Data Recorder (EDR), a Flight Data Recorder (FDR), a vehicle infotainment device, electronic devices for a ship (e.g., a navigation device for a ship, a gyro-compass, etc.), avionics, security devices, an automotive head unit, a robot for home or industry, a drone, an Automated Teller Machine (ATM) in banks, a Point-Of-Sales (POS) terminal in a shop, and an Internet-of-Things device (e.g., a light bulb, various sensors, a sprinkler device, a fire alarm, a thermostat, a streetlamp, a toaster, sporting goods, a hot water tank, a heater, a boiler, etc.). According to some embodiments of the present disclosure, the electronic device may include at least one of a part of a piece of furniture, a building/structure, or a motor vehicle, an electronic board, an electronic signature receiving device, a projector, and various kinds of measuring instruments (e.g., a water meter, an electric meter, a gas meter, and a radio wave meter). In various embodiments of the present disclosure, the electronic device may be flexible, or may be a combination of two or more of the aforementioned various devices. The electronic device according to an embodiment of the present disclosure is not limited to the aforementioned devices. In the present disclosure, the term "user" may indicate a person using an electronic device or a device (e.g. an artificial intelligence electronic device) using an electronic device.

An electronic device 101 within a network environment 100 according to various embodiments of the present disclosure will be described with reference to FIG. 1. The electronic device 101 within the network environment 100 may include a bus 110, a processor 120, a memory 130, an input/output interface 150, a display 160, and a communication interface 170. In some embodiments of the present disclosure, at least one of the above elements of the electronic device 101 may be omitted from the electronic device 101, or the electronic device 101 may additionally include other elements. The bus 110 may include a circuit that interconnects the elements 120 to 170 and delivers a communication (e.g., a control message or data) between the elements 120 to 170. The processor 120 may include one or more of a CPU, an AP, and a Communication Processor (CP). The processor 120 may perform, for example, calculations or data processing related to control over and/or communication by at least one of the other elements of the electronic device 101.

The memory 130 may include a volatile memory and/or a non-volatile memory. The memory 130 may store, for example, commands or data related to at least one of the other elements of the electronic device 101. According to an embodiment of the present disclosure, the memory 130 may store software and/or a program 140. The program 140 may include, for example, a kernel 141, middleware 143, an Application Programming Interface (API) 145, and/or an application program (or an application) 147. At least some of the kernel 141, the middleware 143, and the API 145 may be referred to as an "Operating System (OS)." For example, the kernel 141 may control or manage system resources (e.g., the bus 110, the processor 120, the memory 130, etc.) used to execute operations or functions implemented by the other programs (e.g., the middleware 143, the API 145, and the application program 147). Also, the kernel 141 may provide an interface capable of controlling or managing the system resources by accessing the individual elements of the electronic device 101 by using the middleware 143, the API 145, or the application program 147.

For example, the middleware 143 may serve as an intermediary that enables the API 145 or the application program 147 to communicate with the kernel 141 and to exchange data therewith. Also, the middleware 143 may process one or more task requests received from the application program 147 according to a priority. For example, the middleware 143 may assign a priority, which enables the use of system resources (e.g., the bus 110, the processor 120, the memory 130, etc.) of the electronic device 101, to at least one of the application programs 147, and may process the one or more task requests according to the assigned priority. The API 145 is an interface through which the application 147 controls a function provided by the kernel 141 or the middleware 143, and may include, for example, at least one interface or function (e.g., command) for file control, window control, image processing, character control, or the like. For example, the input/output interface 150 may deliver a command or data, which is input from a user or another external device, to the element(s) other than the input/output interface 150 within the electronic device 101, or may output, to the user or another external device, commands or data received from the element(s) other than the input/output interface 150 within the electronic device 101.

Examples of the display 160 may include a Liquid Crystal Display (LCD), a Light-Emitting Diode (LED) display, an Organic Light-Emitting Diode (OLED) display, a MicroElectroMechanical Systems (MEMS) display, and an electronic paper display. For example, the display 160 may display various pieces of content (e.g., text, images, videos, icons, symbols, and/or the like) to the user. The display 160 may include a touch screen, and may receive, for example, a touch input, a gesture input, a proximity input, or a hovering input provided by an electronic pen or a body part of the user. The communication interface 170 may establish, for example, communication between the electronic device 101 and an external device (e.g., a first external electronic device 102, a second external electronic device 104, or a server 106). For example, the communication interface 170 may be connected to a network 162 through wireless or wired communication and may communicate with the external device (e.g., the second external electronic device 104 or the server 106).

The types of wireless communication may include, for example, cellular communication which uses at least one of Long-Term Evolution (LTE), LTE-Advanced (LTE-A), Code Division Multiple Access (CDMA), Wideband CDMA (WCDMA), Universal Mobile Telecommunications System (UMTS), WiBro (Wireless Broadband), and Global System for Mobile Communications (GSM). According to an embodiment of the present disclosure, the types of wireless communication may include at least one of, for example, Wi-Fi, Light Fidelity (LiFi), Bluetooth, Bluetooth Low Energy (BLE), ZigBee, Near Field Communication (NFC), magnetic secure transmission, Radio Frequency (RF), and Body Area Network (BAN), as exemplified by an element 164 of FIG. 1. According to an embodiment of the present disclosure, the types of wireless communication may include a GNSS. The GNSS may be, for example, a Global Positioning System (GPS), a Global Navigation Satellite System (GLONASS), a Beidou Navigation Satellite System (hereinafter "Beidou"), or a European Global Satellite-based Navigation System (Galileo). Hereinafter, in the present disclosure, the term "GPS" may be used interchangeably with the term "GNSS." The types of wired communication may include at least one of, for example, a Universal Serial Bus (USB), a High Definition Multimedia Interface (HDMI), Recommended Standard 232 (RS-232), Power Line communication (PLC), and a Plain Old Telephone Service (POTS). The network 162 may include at least one of telecommunication networks, such as a computer network (e.g., a Local Area Network (LAN) or a Wide Area Network (WAN)), the Internet, and a telephone network.

Each of the first and second external electronic devices 102 and 104 may be of a type identical to or different from that of the electronic device 101. According to various embodiments of the present disclosure, all or some of operations performed by the electronic device 101 may be performed by another electronic device or multiple electronic devices (e.g., the first and second external electronic devices 102 and 104 or the server 106). According to an embodiment of the present disclosure, when the electronic device 101 needs to perform some functions or services automatically or by a request, the electronic device 101 may send, to another device (e.g., the first external electronic device 102, the second external electronic device 104, or the server 106), a request for performing at least some functions related to the functions or services, instead of performing the functions or services by itself, or additionally. Another electronic device (e.g., the first external electronic device 102, the second external electronic device 104, or the server 106) may execute the requested functions or the additional functions, and may deliver a result of the execution to the electronic device 101. The electronic device 101 may process the received result without any change or additionally and may provide the requested functions or services. To this end, use may be made of, for example, cloud computing technology, distributed computing technology, or client-server computing technology.

Hereinafter, user interfaces displayed on the display of the electronic device according to various embodiments of the present disclosure may be distinguished and described as a page or a screen according to information to be displayed. The page may signify a user interface as a webpage displaying pieces of web information provided by a web server, and the screen may signify a user interface displaying pieces of information stored in the electronic device.

Figure 2:
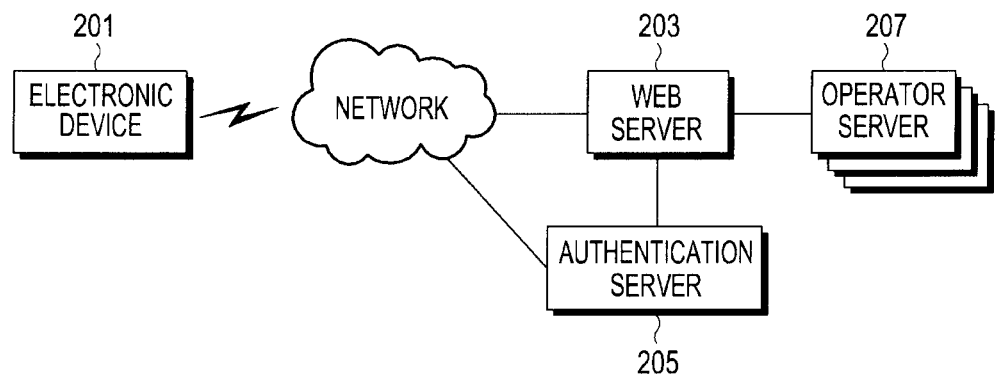
FIG. 2 is a view illustrating a configuration example of a system for electronic commerce in a communication network environment according to various embodiments of the present disclosure.

FIG. 2 is a view illustrating a configuration example of a system for electronic commerce in a communication network environment according to various embodiments of the present disclosure.

Referring to FIG. 2, according to various embodiments of the present disclosure, a communication system for electronic commerce may include an electronic device 201 (e.g., the electronic device 101, 102, or 104 of FIG. 1) and multiple servers (e.g., a web server 203, an authentication server 205, and an operator server 207) which are connected to a network. In addition, the communication system may include other communication apparatuses utilized for electronic commerce.

The electronic device 201 may include an application (e.g., a browser) for searching for web information. The electronic device 201 may receive web information, which is provided by at least one website for electronic commerce, from the web server 203 through wired or wireless communication by using the application. The electronic device 201 may access the web server 203 and may transmit/receive data utilized to purchase a product corresponding to an item selected on a user interface screen (hereinafter referred to as a "webpage") (e.g., a product search page) displaying web information provided by the website.

When the electronic device 201 processes the settlement of a product of which the purchase has been requested on the website, the electronic device 201 may access the authentication server 205 through wired or wireless communication, and may send a settlement approval request for the purchased product, directly or via the web server 203 to the authentication server 205. Also, the electronic device 201 may receive a result of the approval of the settlement from the authentication server 205 in response to the settlement approval request.

The web server 203 may operate in conjunction with multiple operator (or seller) servers 207, may receive information related to products desired to be sold, may store the received information in a memory, and may provide the information through the website according to a request of the electronic device 201. The web server 203 may provide the electronic device 201 with a webpage including pieces of web information to be provided. For example, the webpage may signify a document on a web browser produced to provide information, including text, a picture, image and voice, or the like, through the Internet. The website may signify the collection of webpages configured for a particular service (e.g., an electronic purchase service).

Figure 3:
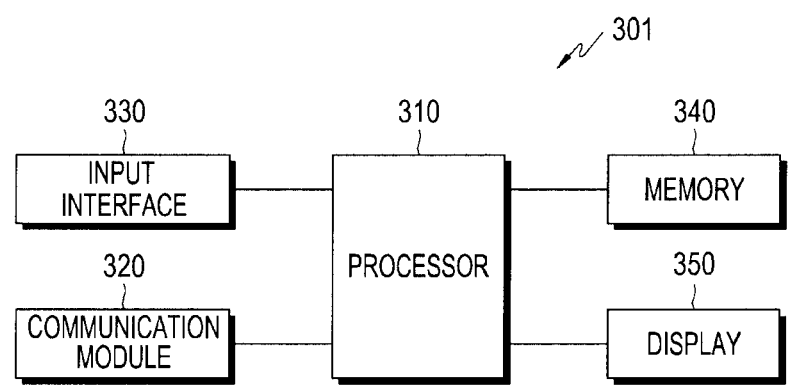
FIG. 3 is a block diagram illustrating a configuration example of an electronic device according to various embodiments of the present disclosure.

FIG. 3 is a block diagram illustrating a configuration example of an electronic device according to various embodiments of the present disclosure.

Referring to FIG. 3, according to various embodiments of the present disclosure, the electronic device 301 (e.g., the electronic device 101 of FIG. 1 or the electronic device 201 of FIG. 2) may include a processor 310, a communication module 320, an input interface 330, a memory 340, and a display 350.

According to various embodiments of the present disclosure, the processor 310 of the electronic device 301 (e.g., the processor 120 of FIG. 1) may process information according to an operation of the electronic device and information according to the execution of a program, an application, or a function. The processor 310 may control operations of the communication module 320, the input interface 330, the memory 340, and the display 350 that access a base station.

According to various embodiments of the present disclosure, the processor 310 may access a web server (identical or similar to the web server 203 of FIG. 2) located on a network, and may perform a control operation for searching for web information provided by a website stored in the accessed web server. The processor 310 may control the display 350 to display a webpage including web information received from the web server.

According to various embodiments of the present disclosure, the processor 310 may access a particular website allowing Internet shopping, and when a particular product desired to be purchased is selected on a product search page displaying a webpage including pieces of web information obtained by a search, may control a product purchase operation of processing an order for and settlement of the selected product and processing the approval of the settlement according to a settlement request.

According to various embodiments of the present disclosure, when a product is purchased using an application, the processor 310 may store information related to the purchase of a product. For example, when a settlement information storage request is received, the processor 310 may control the memory 340 to store settlement information of the product. The settlement information of which the storage has been requested is, for example, information related to the purchase of a product, and may include order detail information, delivery information, settlement means information, site information, and the like. For example, the settlement information of which the storage has been requested may be used when purchase history information for a second purchase is generated.

According to various embodiments of the present disclosure, when a product is purchased using an application, the processor 310 may display a user interface allowing the storage of information related to the purchase of a product. For example, when a user orders the selected product and settles a price for the selected product, if the processor 310 completes the settlement to succeed in the settlement, the processor 310 may check whether settlement information on the product is to be stored. According to various embodiments of the present disclosure, in a state of displaying a settlement page provided during settlement, the processor 310 may check whether an input is received through an input interface as to whether the settlement information is to be stored, and may determine whether the settlement information is to be stored. The settlement page may include a check button (a user interface) for checking whether the settlement information is to be stored.

According to various embodiments of the present disclosure, when a settlement information storage request is received, the processor 310 may generate purchase history information on the product and may store the generated purchase history information in the memory 340. According to various embodiments of the present disclosure, when the settlement has been completed, the processor 310 may generate purchase history information by using at least partial information included in the settlement information, and may control the memory 340 to store the generated purchase history information. The purchase history information may be stored separately from the settlement information, or may be stored in a state of being included in the settlement information. According to various embodiments of the present disclosure, the processor 310 may classify the purchase history information and the settlement information on the product, according to a purchased product by using product identification information (code), and may store the classified settlement information for each product in the form of a table. In various embodiments of the present disclosure, for convenience of description, a table including purchase history information will be referred to as a "purchase history table" and a table including settlement information will be referred to as a "settlement information table".

According to various embodiments of the present disclosure, the processor 310 may check whether the selected product has a purchase history by using a purchase history information table stored in the memory 340. The processor 310 may control a first or second purchase operation to be performed according to whether a product has a purchase history. According to various embodiments of the present disclosure, when the selected product is a first-purchased product or is a product which is not obtained by searching the purchase history information, the processor 310 may control that the product is purchased through a first purchase operation. When the selected product is a repurchased product or is a product obtained by searching the purchase history information, the processor 310 may control that the product is purchased through a second purchase operation. For example, the first purchase operation may include: a sub-operation of searching for a product; a sub-operation of accessing a website; an order sub-operation of ordering a selected product on the accessed website; a login sub-operation of, when a purchase request is made on an order input page, moving to and displaying a login page to receive login information as an input; a sub-operation of, after installing and executing a settlement program, displaying a settlement page; and a sub-operation of completing settlement, including approval of the settlement, result report, and the like, according to a settlement request on the settlement page. From the second purchase operation, at least one of the sub-operations of the first purchase operation may be omitted. For example, it is possible to omit, from the second purchase operation, at least one of a sub-operation of searching for a product, a sub-operation of ordering a product selected through the search, and a sub-operation of receiving login information as an input. According to various embodiments of the present disclosure, when a product is purchased according to the second purchase operation, the processor 310 may control the display 350 to display at least a part of the stored purchase history information. According to various embodiments of the present disclosure, the processor 310 may display purchase history information, which is stored in a purchase history information table, in a list form by using at least one of the latest time order, a category (product type), a price, and a product name.

According to various embodiments of the present disclosure, the processor 310 may perform a control operation for displaying a purchase history information screen including purchase history information generated based on settlement information stored in the memory 340. The processor 310 may select a product to be purchased from a purchase history information list displayed on a purchase history information screen, and when the product is selected, may perform a control operation for immediately purchasing the selected product by using purchase history information of the selected product without a product search sub-operation, an order information input sub-operation, and a login information input sub-operation.

According to various embodiments of the present disclosure, in order to check whether a product selected on a product search page provided by a website or a product included in purchase history information is purchasable, the processor 310 may transmit a purchase-allowable check message to a website corresponding to website information included in the purchase history information. Accordingly, a relevant web server, which provides the website having received the purchase-allowable check message, may transmit, to the electronic device 301, a response message including information (hereinafter referred to as "change information"), such as recommendation of a similar product, according to whether the product according to order information included in the received information is purchasable, whether changed information exists, and/or whether the product is not purchasable.

According to various embodiments of the present disclosure, the processor 310 may perform a control operation for checking whether a product is purchasable, checking whether order information has been changed, and/or recommending a similar product by using change information received from the web server. For example, the processor 310 may perform a control operation for updating the purchase history information by using the change information. The processor 310 may perform a control operation for displaying the received change information together with purchase history information on a purchase history information screen.

According to various embodiments of the present disclosure, during a second purchase, the processor 310 may perform a settlement approval operation for paying the cost of a product to be purchased, and when the payment settlement is successfully completed, may store settlement information (second settlement information) on the second purchase of the product in the memory (e.g., a settlement information table).

According to various embodiments of the present disclosure, the processor 310 may select a product related to objects checked using a short-range communication scheme (e.g., NFC, Bluetooth, etc.), an Augmented Reality (AR) service, and/or an Internet of Things (IoT) service. When the same product is repurchased, the processor 310 may read settlement information of the product from the memory 340 without a product search sub-operation, an order information input sub-operation, and a login information input sub-operation, and may perform a control operation for displaying a settlement screen on the display 350 by using the read settlement information. When the settlement screen is displayed, the processor 310 may be logged into or logged out of the website. Even when the processor 310 does not receive web information from the website, for example, the processor 310 may display the settlement screen by using the settlement information stored in the memory 340 without interworking with the website.

According to various embodiments of the present disclosure, the processor 310 is a hardware module or a software module (e.g., an application program), and may be a hardware constituent element (function) including at least one of various sensors, a data measurement module, an input/output interface, a module that manages a state or an environment of the electronic device, and a communication module, which are included in the electronic device, or a software element (program).

According to various embodiments of the present disclosure, according to the control of the processor 310, the communication module 320 (e.g., the communication interface 170 of FIG. 1) of the electronic device may perform communication with another electronic device (e.g., the electronic device 102 or 104, or the server 106 of FIG. 1, or the web server 203, the authentication server 205, or the operator server 207 of FIG. 2) located on a communication network. According to the control of the processor 310, the communication module 320 may transmit/receive data (e.g., data related to an electronic purchase service) related to an executed operation to/from another electronic device. The communication module 320 may perform communication through a connection to a network or a device-to-device connection which is achieved using wireless or wired communication through a communication interface. The types of wireless communication may include at least one of, for example, Wi-Fi, BlueTooth (BT), ZigBee, Z-Wave, Near Field Communication (NFC), Global Positioning System (GPS), and cellular Communication (e.g., at least one of LTE, LTE-A, LTE-U, LAA, CDMA, WCDMA, UMTS, WiBro, and GSM). The types of wired communication may include at least one of, for example, Universal Serial Bus (USB), High-Definition Multimedia Interface (HDMI), Recommended Standard-232 (RS-232), Plain Old Telephone Service (POTS), Universal Asynchronous Receiver/Transmitter (UART), Inter-Integrated Circuit (I2C), Serial Peripheral Interface (SPI), and Controller Area Network (CAN). Also, the communication module 320 may use all other types of communication schemes, which are widely known or will be developed in the future, as well as the above-described communication schemes.

According to various embodiments of the present disclosure, the input interface 330 (e.g., similar or identical to the input/output interface 150 of FIG. 1) may deliver, to the processor 310, various pieces of information (e.g., number and character information, etc. input from a user), various functional configurations, and a signal input in relation to function control of the electronic device 301. The input interface 330 may support a user input for executing an application supporting a particular function. The input interface 330 may include at least one of a key input means such as a keyboard or keypad, a touch input means such as a touch sensor or touchpad, a voice input means, various sensors, and a camera. The input interface 330 may also include a gesture input means. In addition, the input interface 330 may include all types of input means which are currently being developed or will be developed in the future. According to various embodiments of the present disclosure, the input interface 330 may receive information (e.g., a user interface input according to an electronic purchase service) input by the user through a touch panel of the display 350, and may deliver the received information to the processor 310.

According to various embodiments of the present disclosure, the memory 340 (e.g., the memory 130 of FIG. 1) of the electronic device 301 may temporarily store various data generated during execution of a program, including a program utilized for a functional operation. The memory 340 may broadly include a program area and a data area. The program area may store related information for driving of the electronic device 301, such as an OS which boots the electronic device 301. The data area may store the transmitted/received data and generated data according to various embodiments of the present disclosure. Also, the memory 340 may include at least one storage medium among a flash memory, a hard disk, a multimedia card micro-type memory (e.g., a Secure Digital (SD) or eXteme Digital (xD) memory, or the like), a RAM, and a ROM. According to various embodiments of the present disclosure, the memory 340 may store settlement information, purchase history information, and/or web information included in a webpage.

According to various embodiments of the present disclosure, the display 350 (identical or similar to the display 160 of FIG. 1) may display operation execution information and operation execution result information according to the control of an operation by an operation execution unit (not illustrated). The display 350 may display a list of executable applications or display a result of execution of a configured application. When the display 350 is implemented in the form of a touch screen, the display 350 may correspond to a touch screen of the input interface 330. When the display 350 is implemented in the form of a touch screen, the display 350 may display various pieces of information generated according to a touch action of the user.

According to various embodiments of the present disclosure, the display 350 may display a webpage including web information provided by a website according to an electronic purchase service, information (e.g., input information or a photographed image) received through the input interface 330, and information (e.g., settlement information or purchase history information) read from the memory 340.

According to various embodiments of the present disclosure, the display 350 may be implemented by at least one of an LCD, a Thin Film Transistor LCD (TFT-LCD), an OLED display, an LED display, an Active Matrix Organic LED (AMOLED) display, a flexible display, and a three-dimensional display. Some of the displays may be implemented as a transparent type or an optical transparent type through which the exterior is visible. A representative example of the display may be implemented in the form of a transparent display including a Transparent OLED (TOLED).

In various embodiments of the present disclosure, the main elements of the electronic device have been described with reference to the electronic device 301 illustrated in FIG. 3. However, in various embodiments of the present disclosure, all the elements illustrated in FIG. 3 are not essential elements, and the electronic device 301 may be implemented to include more or less elements than the illustrated elements. Also, the locations of the main elements of the electronic device 301 described in detail with reference to FIG. 3 may be changeable according to various embodiments of the present disclosure.

An electronic device according to various embodiments of the present disclosure may include: a display; a processor that is electrically connected to the display; and a memory that is electrically connected to the processor and stores first purchase history information, which is related to a first purchase of a first product, and first settlement information corresponding to the first purchase history information, such that the memory may be configured to store instructions which cause the processor to: display a user interface for a second purchase of the first product on at least a part of the display by using the first purchase history information and/or the first settlement information stored in the memory; receive a user input related to the user interface; perform settlement for the second purchase in response to the received user input; and store, in the memory, second purchase history information and second settlement information related to the second purchase.

According to various embodiments of the present disclosure, the processor may allow at least a part of the display to display a settlement screen configured based on the purchase history information and/or the settlement information, as the user interface for the second purchase of the first product.

According to various embodiments of the present disclosure, the processor may allow at least a part of the display to display a purchase history information screen, which is configured based on the first purchase history information, as the user interface for the second purchase of the first product; the purchase history information screen may display a purchase history information list including stored pieces of purchase history information on the first product and at least one different second product; and the first product and the at least one different second product displayed in the purchase history information list may correspond to products purchased on different websites.

According to various embodiments of the present disclosure, the processor may check change information on the pieces of purchase history information stored in the memory, and may allow the purchase history information screen to display change information on the checked at least one piece of purchase history information.

According to various embodiments of the present disclosure, the processor may be configured to: recommend a similar product when a non-purchasable product exists among products displayed on the purchase history information screen; display a settlement screen on the basis of stored first settlement information on the non-purchasable product and information on the similar product, when the recommended similar product is selected; process settlement of the similar product when a settlement request command is received on the settlement screen; store second settlement information on the similar product in the memory; and change the first settlement information on the non-purchasable product stored in the memory.

According to various embodiments of the present disclosure, the processor may allow access to and/or login to a website providing the first product on the basis of login-related information included in the stored first settlement information, when a second purchase request for the first product is received.

According to various embodiments of the present disclosure, during a first purchase operation for the first purchase of the first product, the processor may check, through a displayed settlement page, whether the first settlement information is stored, and may allow the memory to store the first settlement information according to a settlement operation for the first purchase of the first product when storage of the first settlement information is requested.

According to various embodiments of the present disclosure, the pieces of first and second settlement information stored in the memory may include at least one piece of information among: parameters of a settlement Application Program Interface (API); address information of the website; automatic login-related information; information related to a check for whether a product is purchasable; information related to recommendation of an item; and information related to association with short-range wireless communication (Near Field Communication (NFC) and Bluetooth).

According to various embodiments of the present disclosure, the processor may select the first product for the second purchase among articles related to external objects by using Internet of Things (IoT).

According to various embodiments of the present disclosure, the processor may select the first product for the second purchase which is related to an external object checked based on short-range wireless communication, an Augmented Reality (AR) service, or an image photographed by a camera.

Figure 4:
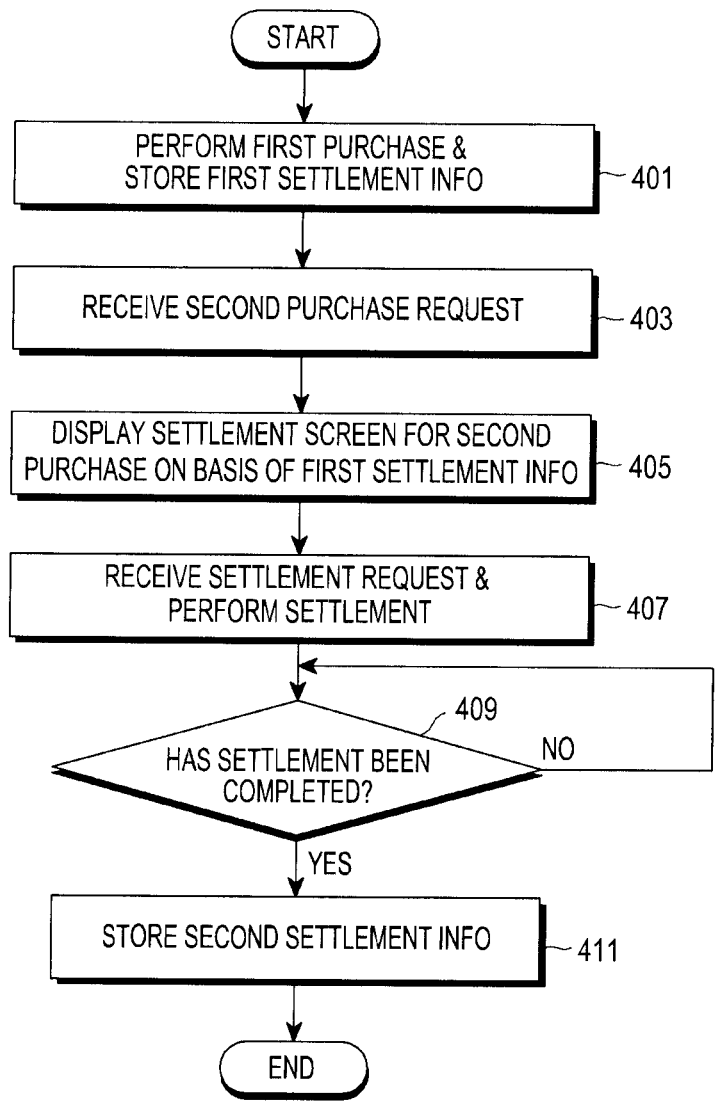
FIG. 4 is a flowchart illustrating an operation of an electronic device according to various embodiments of the present disclosure.

FIG. 4 is a flowchart illustrating an operation of an electronic device according to various embodiments of the present disclosure.

According to various embodiments of the present disclosure, the electronic device (e.g., the electronic device 101 of FIG. 1, the electronic device 201 of FIG. 2, or the electronic device 301 of FIG. 3) may access a web server (e.g., the web server 203 of FIG. 2) that supports electronic commerce and exists on a communication network, and may access a website stored in the web server.

Referring to FIG. 4, in operation 401, a processor of the electronic device may perform a first purchase of a product including operations such as searching for a product through a user interface on an accessed website, selecting the product to be purchased, transmitting an order for the selected product, input of login credentials, the login operation itself, input of settlement information (e.g., payment information), and a settlement operation (e.g., a payment operation). The electronic device may store settlement information (e.g., first settlement information or essentially, payment information) according to the first purchase of the selected product, in a memory (e.g., in a data structure such as a settlement information table). The electronic device may generate and purchase history for the store using the first settlement information.

In operation 403, the processor of the electronic device may receive a second purchase request for the product.

In operation 405, in response to the second purchase request, the processor of the electronic device may display a settlement screen for settlement of the product on the display based on the stored first settlement information. According to various embodiments of the present disclosure, the processor of the electronic device may log in to a website. Also, the electronic device may immediately display the settlement screen on the display without an order input operation (e.g., the website may advance automatically to display of an order finalization page without the intermediary steps of generating the order in terms of item, quantity, shipping, etc.).

In operation 407, according to a settlement request (e.g., the input of a "settle" button on a settlement screen) for the product, the processor of the electronic device may perform settlement (e.g., the input of settlement means information, a request for settlement approval, and/or the reception and display of a result of the settlement approval, etc.) of the product based on the stored first settlement information. The electronic device may display a settlement completion page on the display for settlement approval of the product (e.g., for approving payment to purchase the product). When the settlement completion page is displayed, the electronic device or a user associated with the electronic device may be logged into the website.

In operation 409, the processor of the electronic device may determine whether the settlement or payment has been completed. When it is determined that the settlement has been completed, the processor of the electronic device may perform operation 411. Notably, retries are possible. That is, when the settlement has not been completed, in operation 409, the processor of the electronic device may determine again in operation 409 whether the settlement has been completed. Alternatively, whether the settlement has not been completed, the processor of the electronic device may advance to terminate the process.

In operation 411, the processor of the electronic device may store second settlement information according to the settlement or payment for the second purchase in the memory (e.g., a settlement information table). When the settlement has been successfully completed, the processor of the electronic device may store the second settlement information.

Figures 5A, 5B:
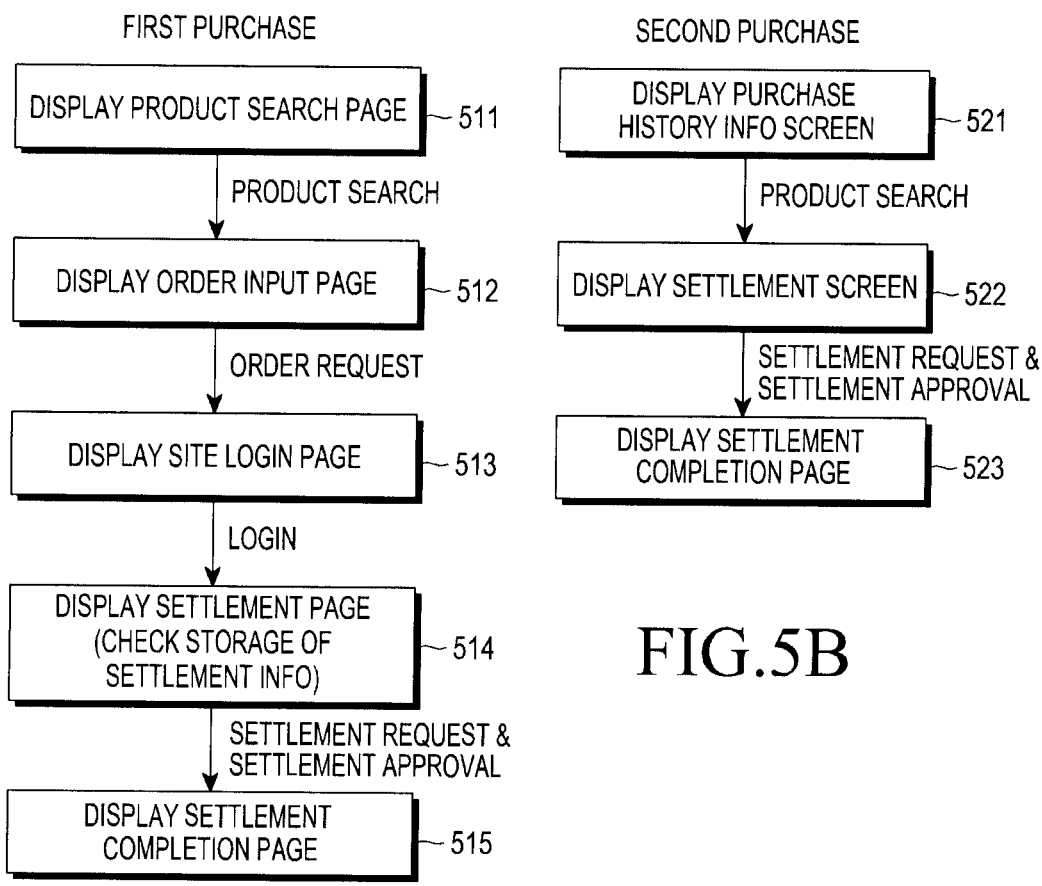
FIG. 5A and FIG. 5B are views illustrating the concept of a first purchase and a second purchase in an electronic device according to various embodiments of the present disclosure.

FIGS. 5A and 5B are view illustrating an example of a user interface according to each of first and second purchase operations in an electronic device according to various embodiments of the present disclosure.

Referring to FIG. 5A, the electronic device according to various embodiments of the present disclosure may display, on the display, a user interface (e.g., pages or screens) for a first purchase operation. Within the user interfaces, a "page" may be displayed including web information provided by an accessed website. A user interface may be referred to as a "screen," displaying various pieces of information (e.g., settlement information and purchase history information) stored in the memory.

According to various embodiments of the present disclosure, during a first purchase operation, the electronic device may display, on the display, a product search page 511 for a product search operation. When a product is selected on the product search page, the electronic device may display an order input page 512 for input of order information. According to various embodiments of the present disclosure, the order input page 512 may display order information including at least one of a product name, product identification information (code), product review, price, amount, option, delivery, discount, benefit/event, and seller information. According to various embodiments of the present disclosure, the electronic device may receive, as an input, at least one piece of information including quantity, product option information (e.g., colors, styles or any other variation on the selected product), and delivery information, on an order input page (e.g., the order input page 512 of FIG. 5A). The electronic device may display the input information on the order input page.

According to various embodiments of the present disclosure, the electronic device may display a login page 513 for access to the website for purchase of a product according to an order request. When the electronic device or user account is already logged into the relevant website providing the selected product, the display of the login page 513 on the display may be omitted. When the electronic device enters an access state to the relevant website through a login operation, the electronic device may display a settlement page 514 (e.g., a payment completion page). The login page 513 may be displayed, for example, before the order input page 512 is displayed. When a button is selected for storage of settlement information included in the settlement page, the electronic device may locally store first settlement information after the settlement is completed. The electronic device may then execute and/or transmit a settlement approval procedure according to a settlement request, and upon successful completion may then display a settlement completion page 515.

Referring to FIG. 5B, the electronic device may display, on the display, related user interfaces (screens or pages) according to a second purchase operation. The electronic device may display a list, which includes purchase history information generated based on settlement information according to the first purchase operation, on the display through a purchase history information screen 521. When a particular product is selected on the purchase history information screen, the electronic device may retrieve settlement information for the selected particular product from memory, and then display a settlement screen 522 using the retrieved settlement information. When a settlement request (e.g., a button or user interface) is input on the settlement screen 522, the electronic device may display, on the display, a settlement completion page 523 for settlement processing and settlement approval. The electronic device may acquire website information on the selected product included in the purchase history information, and may access a relevant website based on the checked website information. The electronic device may access or otherwise log in to the relevant website when the settlement is requested, or may access or otherwise log in to the relevant website when the product is selected.

According to various embodiments of the present disclosure, from the second purchase operation illustrated in FIG. 5B, some of the sub-operations of the first purchase operation illustrated in FIG. 5A may be omitted. For example, some (e.g., the product search page 511, the order input page 512, and/or the login page 513) of the user interfaces may be omitted. Therefore, without repeating the first purchase operation whenever the same product is ordered, the electronic device may repurchase the same product through a simple operation such as the second purchase operation.

Figure 6:
FIG. 6 is a view illustrating an example of a user interface in an electronic purchase operation according to various embodiments of the present disclosure.

FIG. 6 is a view illustrating an example of a webpage in an electronic purchase operation according to various embodiments of the present disclosure.

Referring to FIG. 6, when performing a first purchase in operation 401 of FIG. 4 and a second purchase in operation 405 of FIG. 4, the electronic device according to various embodiments of the present disclosure may display a user interface 610 for checking settlement of a selected product. For example, during a first purchase, the user interface 610 may be displayed as a settlement page which is a webpage including web information provided by an accessed website, and during a second purchase, may be displayed as a settlement screen configured based on settlement information and purchase history information which are stored in the memory.

According to various embodiments of the present disclosure, the user interface 610 (e.g., a settlement page or settlement screen) may include information (e.g., order summary information 611, delivery information 613, settlement means information 615, etc.) usable for settlement of the ordered product. The user interface 610 may include a check button 617 for receiving a check for whether settlement information (first settlement information) is to be stored after the settlement is completed. Also, the user interface 610 may include buttons (e.g., a settlement request button 619 and a cancellation button). According to various embodiments of the present disclosure, the electronic device may receive a settlement request through the settlement request button 619 (e.g., "settle") on the user interface 610.

The electronic device may transmit a settlement request message, which requests approval of payment settlement of the product, to a website of a web server or a settlement server. Accordingly, the web server or settlement server may approve the settlement according to a settlement request, and may transmit a response message, which includes a result of the approval of the settlement, to the electronic device.

FIG. 7 is a view illustrating an example of settlement information stored in an electronic device according to various embodiments of the present disclosure. FIG. 8 is a view illustrating an example of a payment API for an electronic purchase according to various embodiments of the present disclosure.

Referring to FIG. 7, settlement information stored in the memory may include: payment API parameter information; login page (or login screen) address information (Uniform Resource Locator (URL)); information related to whether an automatic login is successful; address information (URL) for checking whether a product is purchasable; item-to-be-recommended search address information (URL); and information for extension of a physical web or NFC.

The payment API parameter information may include: information on payment methods (supportedmethods); amount and price information of products (items) to be purchased (total price information and items to be displayed, and label/amount of each item); and delivery-related information (shippingoptions). The payment API including the payment API parameter information may be implemented by, for example, a program illustrated in FIG. 8.

According to various embodiments of the present disclosure, the payment API parameter information may be configured as a part 801 expressed as "var request=new paymentrequest(~" in FIG. 8. In relation to the pieces of information for checking the settlement displayed on the user interface 610 of FIG. 6 (e.g., a settlement screen), the settlement means information 615 may correspond to the supported methods included in the payment API parameter information, and may be configured as, for example, "supportedMesthods:['visa']}]," at the part 801 which, in the program of FIG. 8, corresponds to the payment API parameter information.

According to various embodiments of the present disclosure, the order summary information 611 of FIG. 6 may correspond to the information on the amount and price of each of the items, and may be configured as, for example, "label:'total', amount: {currency: 'USD', value:'55.00'}}," at the part 801 which, in the program of FIG. 8, corresponds to the payment API parameter information.

According to various embodiments of the present disclosure, the delivery information 613 of FIG. 6 may correspond to the shipping options, and may be configured as, for example, "id:'Free shippingoption', label:'free global shipping', amount:{currency: 'USD', value:'0'}, selected: true" at the part 801 of FIG. 8.

The login page address information (URL) is address information (URL) of a page inquiring about an ID/PW when a user logs in to the page, and may include, for example, a URL in the form of a HyperText Markup Language (HTML) ID/password when the login is successful.

The information related to whether an automatic login is successful may be information for checking whether a website allows an automatic login. For example, the information related to whether an automatic login is successful may be represented as "true" if an automatic login is allowed, and may be represented as "false" if not. According to various embodiments of the present disclosure, when the information related to whether an automatic login is successful is capable of immediately and automatically accessing the login page address information and thus is set to be "true", without performing an order input operation and a login information input operation on a login screen (page), the electronic device may immediately perform an automatic login on a purchase history information screen as in a second purchase operation illustrated in of FIG. 5B, and may immediately configure and display a settlement screen.

The address information (URL) for checking whether a product is purchasable may be address information allowing a check for whether a product selected from a purchase history information list during the second purchase operation is purchasable on a website included in first settlement information. For example, the address information (URL) for checking whether a product is purchasable may be information which, when a payment API parameter is delivered in a JSON format, allows a check for whether the product is purchasable or price information has been changed and allows a payment API parameter to be retransmitted to the relevant website in the same JSON format. In order to know the address information (URL), a settlement screen may include a meta tag.

The item-to-be-recommended search address information (URL) may be address information which, when a product desired to be purchased is out of stock, allows a search for a product to be recommended instead of the desired product. For example, the item-to-be-recommended search address information (URL) may be address information (URL) which, when a product desired to be purchased is not purchasable or the price of the desired product is changed on the relevant website and thus a different product is attempted to be purchased, allows a search for a product to be recommended. In order to know the address information (URL), a site page may include a meta tag.

The information for extension of a physical web or NFC may be information used to extend a physical web or NFC. A unique ID value for extension of Bluetooth/NFC may be assigned, and the assigned ID value may be provided to a settlement screen through a meta tag. According to various embodiments of the present disclosure, when the electronic device receives a product purchase request signal through Bluetooth or NFC, the electronic device may purchase a product corresponding to a unique ID value included in the received signal, and may configure and display a purchase history information screen or a settlement screen on the basis of information (at least one piece of information among payment API parameter information, login page address information (URL), information related to whether an automatic login is successful, address information (URL) for checking whether a product is purchasable, and item-to-be-recommended search address information (URL)) other than information for extension of a physical web or NFC in first settlement information stored to correspond to the unique ID value.

Figure 9:
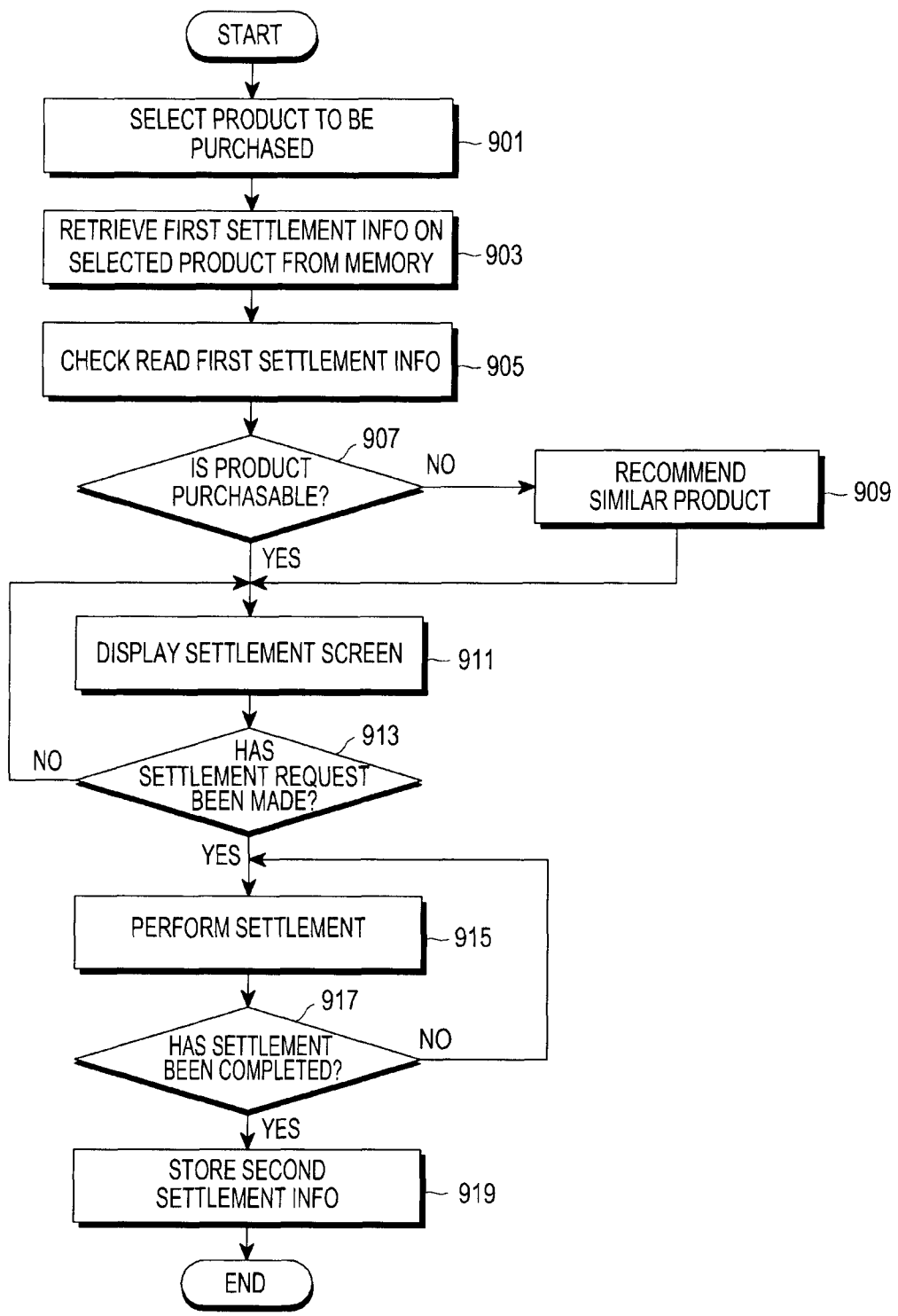
FIG. 9 is a flowchart illustrating an operation of an electronic device according to various embodiments of the present disclosure.

FIG. 9 is a flowchart illustrating an operation of an electronic device according to various embodiments of the present disclosure.

When purchasing a first-purchased product not having a purchase history (e.g., performing a first purchase), the electronic device (e.g., the electronic device 101 of FIG. 1, the electronic device 201 of FIG. 2, or the electronic device 301 of FIG. 3) according to various embodiments of the present disclosure may access a web server (e.g., the web server 203 of FIG. 2), which supports electronic commerce and exists on a communication network, and may access a website stored in the web server. For example, using a user interface on the accessed website, the electronic device may perform a first purchase of a product through: an operation of searching for a product and selecting the product to be purchased; an operation of inputting an order for the selected product; a login information input operation; a settlement information input operation; and an operation of processing/approving the settlement. For example, when the settlement of the first purchase is successfully completed, the electronic device may store, in the memory (e.g., a settlement information table), settlement information (first settlement information) according to the first purchase of the selected product. The first settlement information may include the pieces on information of FIG. 7. The first settlement information may be configured in the form of a settlement API program as illustrated in FIG. 8 and may be stored in the memory. According to various embodiments of the present disclosure, the electronic device may generate and store purchase history information on the purchased product on the basis of the first settlement information. The first settlement information and the purchase history information may be respectively stored in different databases, or may be stored therein in association with each other. After the electronic device performs the first purchase operation, the electronic device may perform a second purchase of a product selected using a purchase history information list, a short-range wireless communication service, an AR service, or the like which is displayed on a purchase history information screen.

Referring to FIG. 9, in operation 901, the processor of the electronic device may select a product to be purchased for a second purchase. According to various embodiments of the present disclosure, when a purchase application is executed or a pre-purchased product is selected on a product search screen, the processor of the electronic device may display, on the display, a purchase history information screen displaying a purchase history information list, and may select a product to be purchased from the displayed purchase history information list. According to various embodiments of the present disclosure, when a product is selected on a product search page provided by an accessed webpage, the processor of the electronic device may determine whether settlement information or purchase history information of a product corresponding to the selected product is stored, and thereby may check whether the product selected on the product search page is a pre-purchased product. When it is checked that the selected product is not a pre-purchased product, the processor of the electronic device may perform a purchase operation for the selected product as in the first purchase operation.

According to various embodiments of the present disclosure, when a short-range wireless communication service, an AR service, or the like is used, the processor of the electronic device may receive a wireless signal including a unique ID value from an external device, and may select a product corresponding to the unique ID value included in the received wireless signal, or may select a product to be purchased, on the basis of the stored purchase history information of pre-purchased products related to the product corresponding to the unique ID value.

In operation 903, the processor of the electronic device may retrieve the first settlement information on the selected product from the memory (e.g., a settlement information table or a purchase history table). According to various embodiments of the present disclosure, when a product to be purchased is selected, the processor of the electronic device may read settlement information included in or mapped to purchase history information on the selected product. According to various embodiments of the present disclosure, when a short-range wireless communication service or an AR service is used, the processor of the electronic device may read settlement information of a particular product including identification information corresponding to the received unique identification information. The identification information included in the settlement information may be unique identification information (ID) included in the information for extension of a physical web or NFC of FIG. 7.

In operation 905, the processor of the electronic device may check the retrieved settlement information on the selected product. According to various embodiments of the present disclosure, the processor of the electronic device may check whether the selected product is purchasable, based on address information for determining whether a product is purchasable included in the read settlement information, as described in FIG. 7. For example, the processor of the electronic device may transmit, to a web server, a purchase-allowable check message including information on a product selected by the address information for checking whether a product is purchasable included in the read relevant settlement information, and may receive, from the web server, a response message including resulting information (hereinafter referred to as "change information" or "update information") obtained by checking the settlement information. The processor of the electronic device may check whether the selected product is purchasable, on the basis of the received change information. According to various embodiments of the present disclosure, when a purchase history information screen is displayed on the display, the processor of the electronic device may display the received change information. The electronic device may display, together, the received change information and change information on other products, which are displayed on the purchase history information screen, other than the selected product. The change information may be received periodically or during the execution of an application and may be included in the stored settlement information.

According to various embodiments of the present disclosure, the processor of the electronic device may check login page address information and information related to whether an automatic login is successful, which are included in the read settlement information, as described in FIG. 7, and may check whether a website providing the selected product allows an automatic login. When the website allows an automatic login, the processor of the electronic device may automatically log in to the website, as a response to the second purchase request.

In operation 907, the processor of the electronic device may determine whether the selected product is purchasable, based on the received change information. When it is determined that the selected product is not purchasable, the processor of the electronic device may perform operation 909 which is to recommend a similar product. When the selected product is purchasable, the processor of the electronic device may perform operation 911.

In operation 909, the processor of the electronic device determines, on the basis of the received change information, that the selected product is not purchasable, and thus may recommend a similar product on the basis of product-to-be-recommended-related information on the product included in the change information, or on the basis of product-to-be-recommended-related information obtained by making a search on the basis of item-to-be-recommended search address information of the settlement information as described in FIG. 7. According to various embodiments of the present disclosure, the processor of the electronic device may update the stored purchase history information by using the change information. The processor of the electronic device may update purchase history information stored in the memory by using information on purchase of a recommended product.

In operation 911, the processor of the electronic device may cause a display to display a settlement screen corresponding to the selected product or the recommend similar product on the display on the basis of the first settlement information. According to various embodiments of the present disclosure, when a purchase history information screen is displayed on the display before operation 911, the processor of the electronic device may allow a screen of the display to switch from the purchase history information screen to the settlement screen. According to various embodiments of the present disclosure, when a wireless signal including unique identification information on a product is received, the processor of the electronic device may execute a purchase application in response to the received wireless signal, and may immediately display a settlement screen related to a product corresponding to the unique identification information. According to various embodiments of the present disclosure, the settlement screen may be displayed based on the program of the payment API of FIG. 8. According to various embodiments of the present disclosure, the processor of the electronic device may call "paymentrequest" from a program of a payment API in response to a purchase request signal for a product selected on the purchase history information screen, or in response to a wireless signal including the unique identification information, and may display information stored in a "paymentrequest" part (e.g., reference numeral 801) on the settlement screen. In operation 913, the processor of the electronic device may determine whether a settlement request has been made for a second purchase according to the settlement information shown on the displayed settlement screen. According to various embodiments of the present disclosure, when a user selects a settlement request button (e.g., "settle") included in the settlement screen, the processor of the electronic device may receive an input signal of the settlement request button. The processor of the electronic device may determine whether a settlement request is made, according to whether an input signal is received. When it is determined that the settlement request has been made, the processor of the electronic device may perform operation 915. When the settlement request has not been made, the processor of the electronic device may perform operation 911.

In operation 915, the processor of the electronic device may execute the settlement of the selected product based on the first settlement information or the updated purchase history information in response to the reception of the settlement request. According to various embodiments of the present disclosure, the processor of the electronic device may transmit, to the web server, a settlement approval request message including the first settlement information. During a settlement approval operation, the processor of the electronic device may transmit authentication information on a settlement means to an authentication server or the web server, and may receive a result of the authentication or a result of the approval of the settlement from the authentication server or web server.

In operation 917, the processor of the electronic device may determine whether the settlement is completed. When it is determined that the settlement has been successfully completed, the processor of the electronic device may perform operation 919. In contrast, when the settlement has not been completed, the processor of the electronic device may perform operation 915. According to various embodiments of the present disclosure, when the settlement has not been successfully completed, the processor of the electronic device may again input the authentication information in operation 915. Alternatively, when a settlement request cannot be made any longer, the processor of the electronic device may notify of the failure of the settlement, and may terminate the operation.

In operation 919, the processor of the electronic device may store the second settlement information utilized in the settlement of the second purchase in the memory (e.g., a settlement information table or a purchase history table). According to various embodiments of the present disclosure, the processor of the electronic device may update the first settlement information to the second settlement information and may store the updated settlement information.

Figure 10:
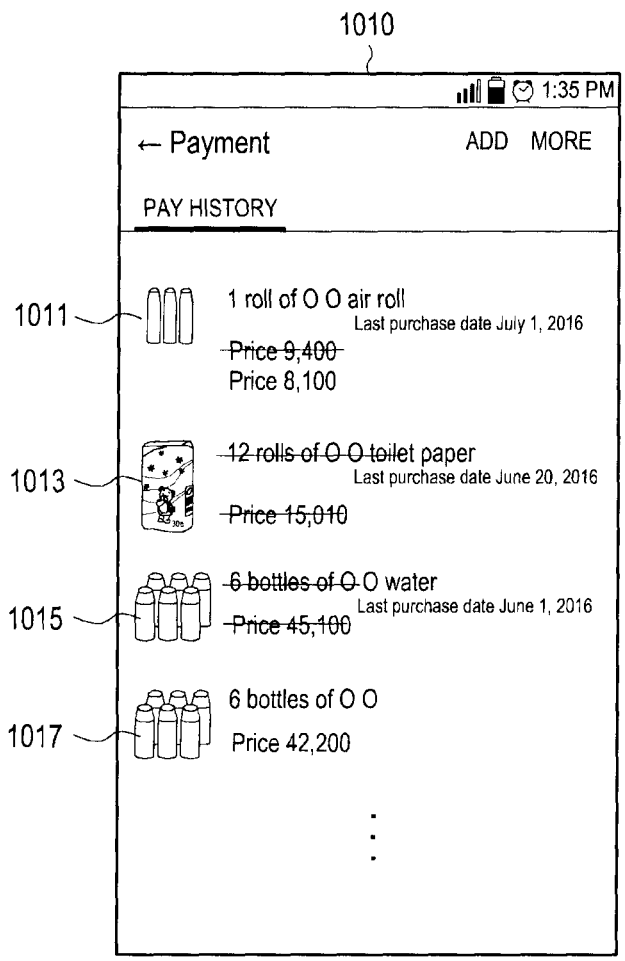
FIG. 10 is a view illustrating an example of a user interface in an electronic purchase operation according to various embodiments of the present disclosure.

FIG. 10 is a view illustrating an example of a webpage in an electronic purchase operation according to various embodiments of the present disclosure.

When selecting a product to be purchased as in operation 901 of FIG. 9, the electronic device (e.g., the electronic device 101 of FIG. 1, the electronic device 201 of FIG. 2, or the electronic device 301 of FIG. 3) according to various embodiments of the present disclosure may display, on the display, purchase history information as illustrated in FIG. 10. For example, the purchase history information may display, on the display, a purchase history information screen 1010 including a purchase history information list. According to various embodiments of the present disclosure, the electronic device may display all the pieces of purchase history information included in a purchase history information table stored in the memory, or may display pieces of purchase history information related to the purchases for the latest one month, or pieces of history information on products purchasable for the latest one month.

Referring to FIG. 10, while displaying information on pre-purchased products, the electronic device may display the change information (such as that received in an operation 909 of FIG. 9) together with the information on the pre-purchased products. According to an embodiment of the present disclosure, when the price of a first product 1011 of FIG. 10 is changed, the electronic device may indicate an updated price included in first settlement information (e.g., 9,400) to the new price information (e.g., 8,100) for the first product 1011 and display the same. According to an embodiment of the present disclosure, the electronic device may check the received change information, and when non-purchasable products exist, as in the case of second and third products 1013 and 1015 of FIG. 10, may display that the relevant products 1013 and 1015 are not purchasable using some indicator, such as a strikethrough as shown in FIG. 10. According to an embodiment of the present disclosure, when a product is out of production as in the case of the third product 1015, the electronic device may recommend a similar product 1017 instead of the unavailable product 1015. When the recommended similar product 1017 is selected, the electronic device may immediately transition to a settlement screen according to a second purchase (such as that described in FIG. 9). At this time, the settlement screen may display information on the selected similar product 1017 instead of information on the discontinued third product 1015 in a product order summary information area.

FIGS. 11A and 11B are views illustrating examples of a webpage in an electronic purchase operation according to various embodiments of the present disclosure.

Referring to FIGS. 11A and 11B, according to various embodiments of the present disclosure, the electronic device (e.g., the electronic device 101 of FIG. 1, the electronic device 201 of FIG. 2, or the electronic device 301 of FIG. 3) may display a purchase history information list on a purchase history information screen 1101. For example, the electronic device may display check buttons 1121, 1123, 1125, and 1127 according to respective products 1111, 1113, 1115, and 1117. When a product (e.g., reference numeral 1111 and/or 1117) to be purchased is selected from among products included in a purchase history information list through a user interface, the check button 1121 and/or 1127 for the selected product may be checked. When a settlement request button (e.g., "settlement request") 1129 is input, the electronic device may make settlement requests for all of the checked products (e.g., reference numeral 1111 and/or 1117) together.

According to an embodiment of the present disclosure, the electronic device may display a settlement screen 1102 on the display. The settlement screen 1102 may include pieces of order summary information 1131 and 1133 on the products 1111 and 1117 of which the settlement has been requested, delivery-related information 1137 thereon, settlement means information 1139 thereon, or the total settlement amount 1135 to be paid. The electronic device may include a button 1141 that requests the storage of settlement information included in the settlement screen 1102. When an input to the button 1141 is checked, the electronic device may store second settlement information corresponding to each of the products 1111 and 1113 according to a second purchase. According to various embodiments of the present disclosure, the electronic device may not store second settlement information of the product 1113 of which settlement information is not changed, and may store only second settlement information of the product 1111 to which change information is applied, as updated information of the stored first settlement information of the product 1111. When an input to a settlement request button 1143 (e.g., "settle") is checked, the electronic device may perform a settlement processing and settlement approval operation.

Figures 12A, 12B:
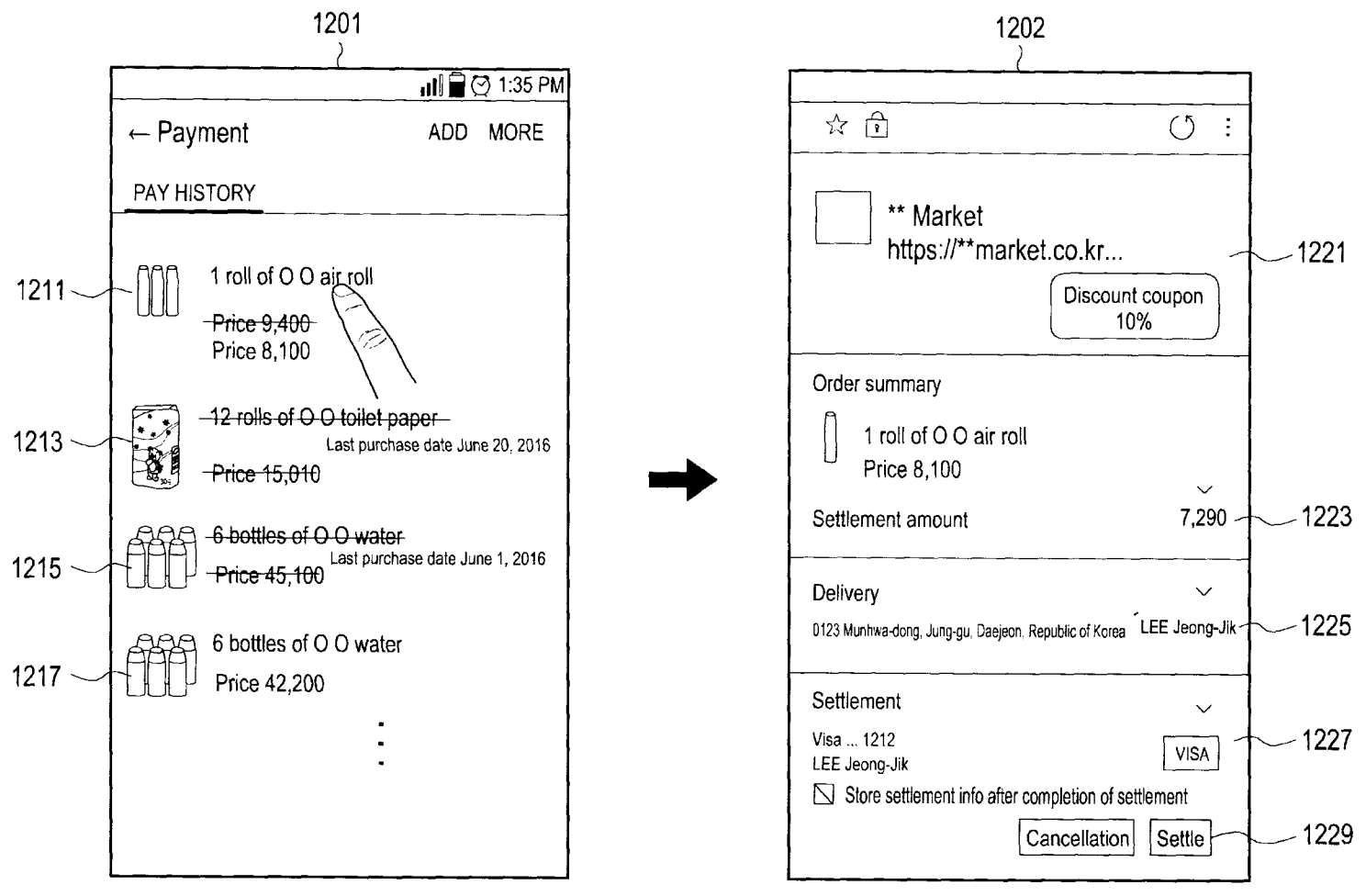

Referring to FIGS. 12A and 12B, when a first product 1211 is selected from among products 1211, 1213, 1215, and 1217 displayed on a purchase history page 1201 as illustrated in FIG. 12A, the electronic device (e.g., the electronic device 101 of FIG. 1, the electronic device 201 of FIG. 2, or the electronic device 301 of FIG. 3) may display a settlement screen 1202 related to the first product 1211, as illustrated in FIG. 12B. According to an embodiment of the present disclosure, the settlement screen 1202 may include at least one piece of information among information 1221 of a website (e.g., a website of ** market) providing the selected product 1211, order summary information 1223 on the product 1211 to be purchased, delivery-related information 1225 thereon, and settlement means information 1227 thereon. The information 1221 of the website may include identification information of the website, address information thereof, and discount coupon information provided by the website. When receiving an input to a settlement request button 1229 (e.g., "settle"), the electronic device may perform a settlement processing and settlement approval operation.

According to various embodiments of the present disclosure, when an application is executed, the electronic device may display the purchase history information screen 1201 illustrated in FIG. 12A. When the product 1211 is selected on the purchase history information screen 1201, the electronic device may automatically log in to the relevant website (e.g., a website of ** market) providing the product 1211, on the basis of login page address information and information (e.g., true) related to whether an automatic login is successful which are included in stored first settlement information of the product 1211. When settlement means information is not included in stored settlement information on the product 1211, for example, information on payment methods as described in FIG. 7, the electronic device may read settlement means information stored in the website into which the electronic device is automatically logged, and may display the settlement screen 1202 on the basis of the stored settlement information, the settlement means information read from the website, and the settlement information stored in the memory.

According to various embodiments of the present disclosure, when a previous purchase website checked through the stored first settlement information of the selected product 1211 is different from a purchase website included in change information, the electronic device may log in to the changed purchase website, and then may display the settlement screen 1202. When the electronic device displays the settlement screen 1202 and then receives an input to the settlement request button 1229, the electronic device may log in to the changed purchase website, may transmit the settlement information to the changed purchase website, and then may perform a settlement processing and settlement approval operation.

According to various embodiments of the present disclosure, when receiving a settlement request according to the selection of the settlement request button 1229 of FIG. 12B, the electronic device may transmit, to a web server storing the accessed website, a settlement request message for making a settlement request, and may display, on the display, a webpage related to a settlement approval operation provided by the website.

Figure 13:
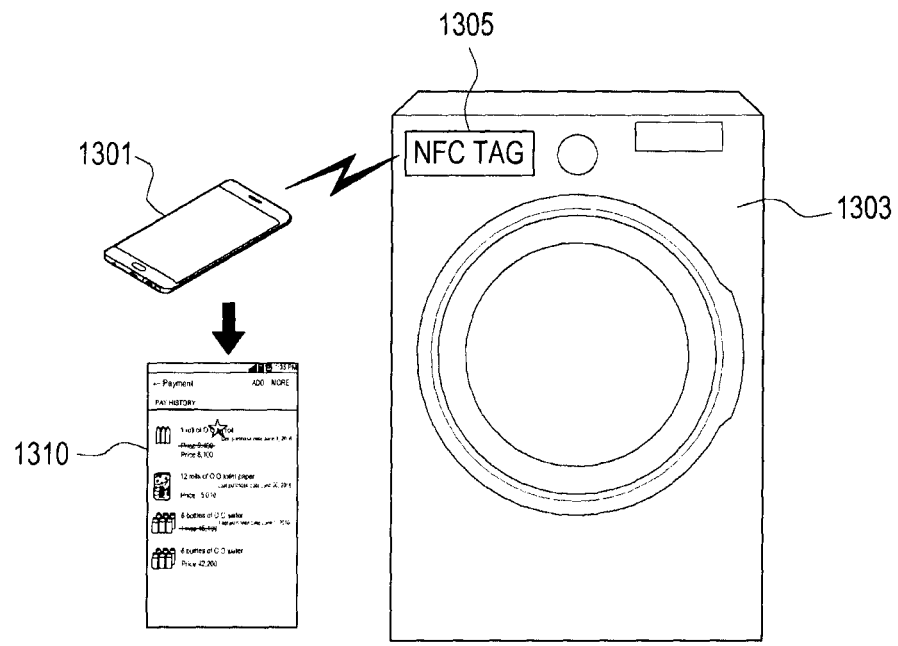
FIG. 13 is a view illustrating an example of an electronic purchase method using an electronic device according to various embodiments of the present disclosure.
Figure 14:
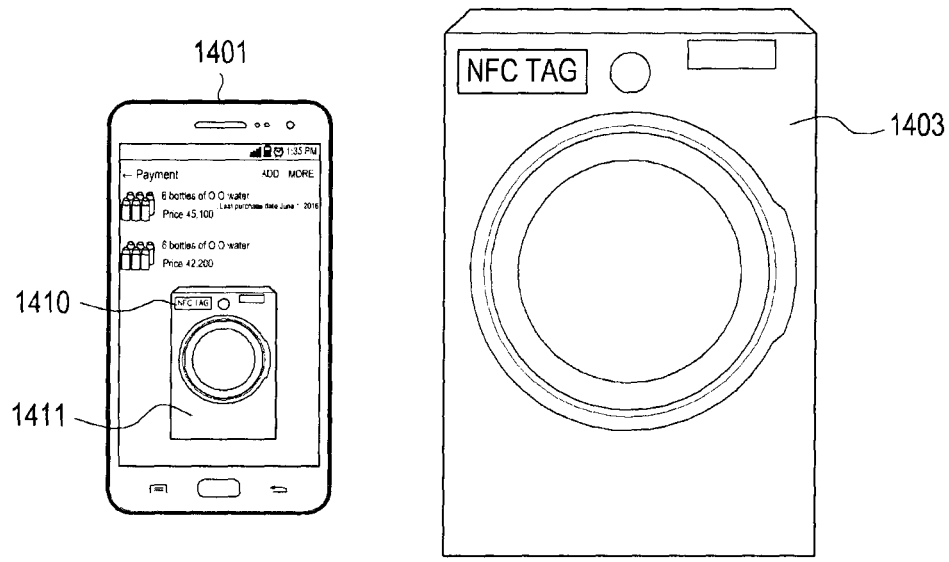
FIG. 14 is a view illustrating an example of an electronic purchase method using an electronic device according to various embodiments of the present disclosure.

FIG. 13 is a view illustrating an example of an electronic purchase method using an electronic device according to various embodiments of the present disclosure. FIG. 14 is a view illustrating an example of an electronic purchase method using an electronic device according to various embodiments of the present disclosure.

Referring to FIG. 13, the electronic device 1301 (e.g., the electronic device 101 of FIG. 1, the electronic device 201 of FIG. 2, or the electronic device 301 of FIG. 3) may purchase products related to objects by using an IoT service scheme or a short-range communication service scheme. According to various embodiments of the present disclosure, the electronic device 1301 may communicate with a tag 1305 attached to an object (e.g., a washing machine) 1303 according to, for example, a short-range wireless communication (e.g., NFC communication) scheme, in operation 901 of FIG. 9, and may select a product on the basis of information read from the tag 1305. According to an embodiment of the present disclosure, the electronic device 1301 may display a purchase history information screen 1310 including purchase history information of products related to the recognized object (e.g., a washing machine) 1303. According to an embodiment of the present disclosure, the electronic device 1301 may label a product related to the recognized object (e.g., a washing machine) 1303 with a particular sign (e.g., a bookmark, etc.) and may display the labelled product on the purchase history information screen 1310, may check whether changed information on the relevant product exists, and may immediately perform the settlement of a second purchase of the relevant product by using first settlement information of the relevant product which is updated to the changed information.

Referring to FIG. 14, the electronic device 1401 (e.g., the electronic device 101 of FIG. 1, the electronic device 201 of FIG. 2, or the electronic device 301 of FIG. 3) may photograph an object (e.g., a washing machine) 1403 by using an AR service or a camera, may analyze a photographed image of the object, and when the object 1403 is recognized based on a result of the analysis, may display a purchase history information screen including purchase history information of a product related to the recognized object 1403. According to an embodiment of the present disclosure, the electronic device 1401 may display the photographed image 1411 of the object 1403 on the purchase history information screen 1410. The electronic device 1401 may display purchase history information of products related to the recognized object (e.g., a washing machine) 1403.

Figure 15:
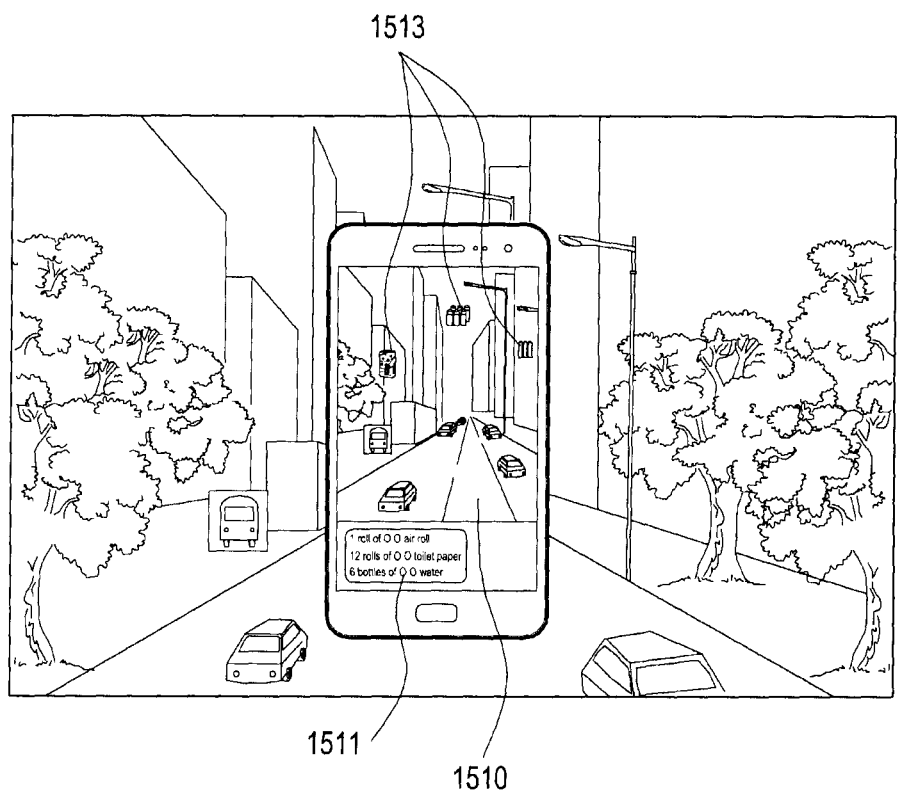
FIG. 15 is a view illustrating an example of a screen for an electronic purchase in an electronic device according to various embodiments of the present disclosure.

FIG. 15 is a view illustrating an example of a screen for an electronic purchase in an electronic device according to various embodiments of the present disclosure.

Referring to FIG. 15, the electronic device (e.g., the electronic device 101 of FIG. 1, the electronic device 201 of FIG. 2, or the electronic device 301 of FIG. 3) may store information on products purchased at shops. For example, the electronic device may receive the input of information on products that a user has purchased at a shop, and store the same. The electronic device may acquire, from an electronic receipt, and store information on products purchased at a shop.

According to various embodiments of the present disclosure, the electronic device may display purchase history information on products purchased at shops included in an image (e.g., a street view) photographed using an AR service. For example, the purchase history information may be purchase history information on products purchased on webpages related to the shops. According to an embodiment of the present disclosure, based on the stored purchase history information of products purchased at shops included in the photographed image, the electronic device may display a purchase history information list 1511 on a user interface providing a currently-displayed AR service, or may display a purchase history information screen including the purchase history information list. According to an embodiment of the present disclosure, the electronic device may display an object (e.g., emoticon) 1513 representing a purchased product in a relevant shop display area on a user interface providing an AR service. When a user selects the object 1513, the electronic device may display a settlement screen on the basis of the stored first settlement information on the relevant product. When a settlement button is touched on the settlement screen or the object 1513 displayed on the user interface providing the AR service is selected, the electronic device may transmit the read first settlement information to a web server providing a relevant website. Therefore, the electronic device may send a request for purchase of the selected product to the relevant web server.

According to various embodiments of the present disclosure, when it is desirable to change a part of the first settlement information on the object 1513, the electronic device may display a purchase history information screen, and may display change information on the selected product on the displayed purchase history information screen. The electronic device may select an item to be purchased to which the change information corresponding to the object 1513 is applied.

An electronic purchase method using an electronic device according to one of various embodiments of the present disclosure may include: displaying a user interface for a second purchase of a first product on at least a part of a display by using first purchase history information and/or first settlement information on the first product stored in a memory of the electronic device; receiving a user input related to the user interface; performing settlement for the second purchase in response to the received user input; and storing, in the memory, second purchase history information and second settlement information related to the second purchase.

According to various embodiments of the present disclosure, the method may further include: performing a first purchase operation as a response to a first purchase request for the first product; checking whether first settlement information according to the first purchase operation is stored; and storing, in the memory, the first settlement information of a first purchase of the first product when a storage request for the first settlement information is received.

According to various embodiments of the present disclosure, settlement information stored in the memory may include: parameters of a settlement Application Program Interface (API); address information of the website; automatic login-related information; information related to a check for whether a product is purchasable; information related to recommendation of an item; and information related to association with short-range wireless communication (Near Field Communication (NFC) and Bluetooth).

According to various embodiments of the present disclosure, the displaying of the user interface for the second purchase of the first product may include displaying a settlement screen, which is configured based on the purchase history information and/or the settlement information, on at least a part of the display.

According to various embodiments of the present disclosure, the displaying of the user interface for the second purchase of the first product may include displaying a purchase history information screen, which is configured based on the first purchase history information, as the user interface for the second purchase of the first product on at least a part of the display, such that the purchase history information screen may display a purchase history information list including stored pieces of purchase history information on the first product and at least one different product, and such that the first product and the at least one different second product displayed in the purchase history information list may correspond to products purchased on different websites.

According to various embodiments of the present disclosure, the displaying of the user interface for the second purchase of the first product may further include: checking change information on the pieces of purchase history information stored in the memory; and displaying change information on the checked at least one piece of purchase history information, on the purchase history information screen.

According to various embodiments of the present disclosure, the displaying of the user interface for the second purchase of the first product may further include: recommending a similar product when a non-purchasable product exists among products displayed on the purchase history information screen; displaying a settlement screen on the basis of stored first settlement information on the non-purchasable product and information on the similar product, when the recommended similar product is selected; processing settlement of the similar product when a settlement request command is received on the settlement screen;

storing second settlement information on the similar product in the memory; and deleting the first settlement information on the non-purchasable product stored in the memory.

According to various embodiments of the present disclosure, the method may further include accessing and/or logging in to a website providing the first product on the basis of login-related information included in the stored first settlement information, when a second purchase request for the first product is received.

According to various embodiments of the present disclosure, the method may further include: recognizing an external object on the basis of short-range wireless communication, an Augmented Reality (AR) service, or an image photographed by a camera; and selecting the first product for the second purchase on the basis of identification information on the recognized external object.

Figure 16:
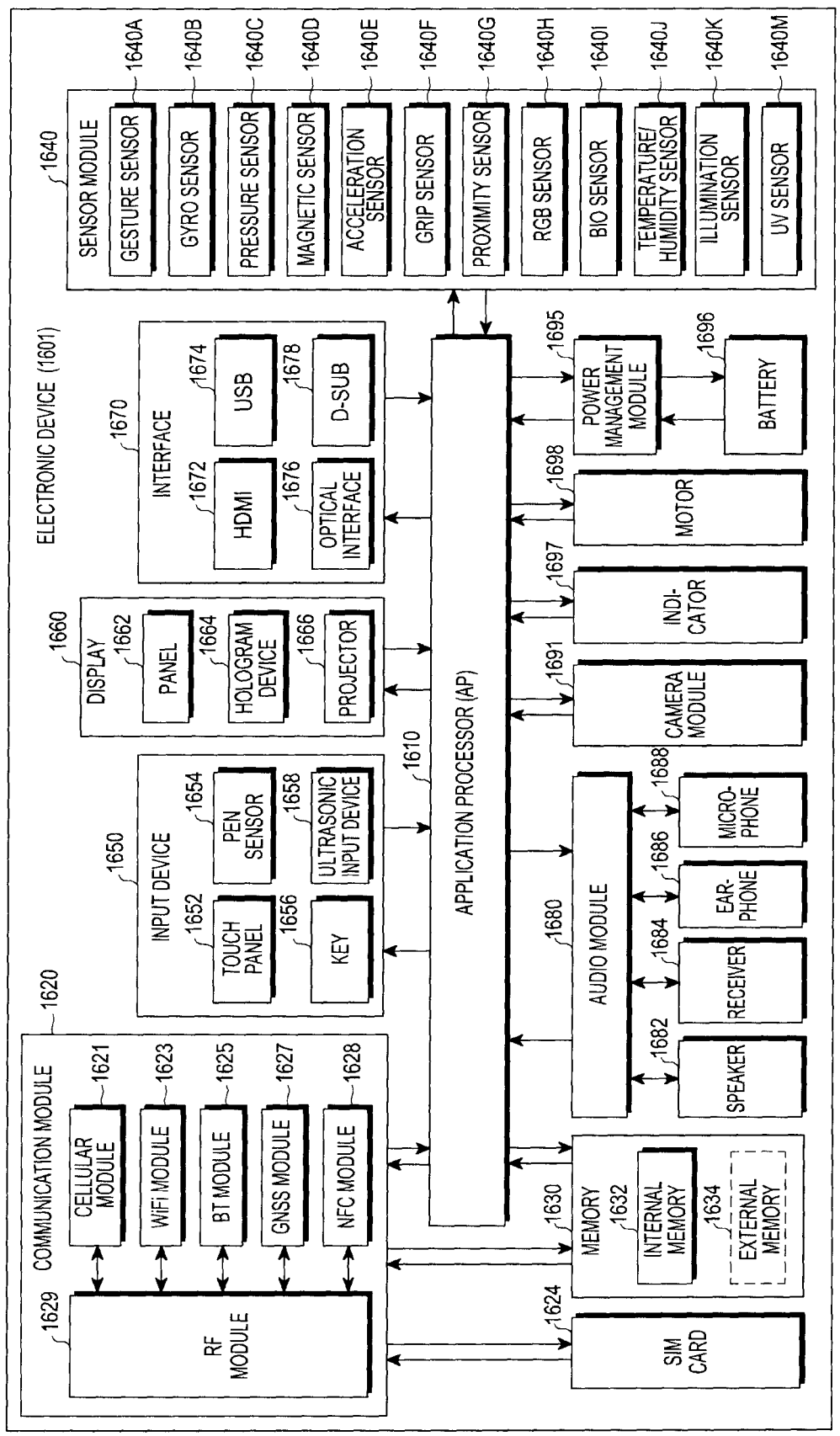
FIG. 16 is a block diagram illustrating a configuration of an electronic device according to various embodiments of the present disclosure.

FIG. 16 is a block diagram illustrating a configuration of an electronic device according to various embodiments of the present disclosure.

The electronic device 1601 may include, for example, the whole or part of the electronic device 101 illustrated in FIG. 1. The electronic device 1601 may include at least one processor (e.g., an AP) 1610, a communication module 1620, a subscriber identification module 1624, a memory 1630, a sensor module 1640, an input apparatus 1650, a display 1660, an interface 1670, an audio module 1680, a camera module 1691, a power management module 1695, a battery 1696, an indicator 1697, and a motor 1698. The processor 1610 may control multiple hardware or software elements connected to the processor 1610 and may perform the processing of and arithmetic operations on various data, by running, for example, an OS or an application program. The processor 1610 may be implemented by, for example, a System on Chip (SoC). According to an embodiment of the present disclosure, the processor 1610 may further include a Graphics Processing Unit (GPU) and/or an image signal processor. The processor 1610 may include at least some (e.g., a cellular module 1621) of the elements illustrated in FIG. 16. The processor 1610 may load, into a volatile memory, instructions or data received from at least one (e.g., a non-volatile memory) of the other elements and may process the loaded instructions or data, and may store the resulting data in a non-volatile memory.

The communication module 1620 may have a configuration identical or similar to that of the communication interface 170. The communication module 1620 may include, for example, the cellular module 1621, a Wi-Fi module 1623, a Bluetooth (BT) module 1625, a GNSS module 1627, an NFC module 1628, and an RF module 1629. For example, the cellular module 1621 may provide a voice call, a video call, a text message service, an Internet service, and the like through a communication network. According to an embodiment of the present disclosure, the cellular module 1621 may identify or authenticate the electronic device 1601 in the communication network by using the subscriber identification module (e.g., a Subscriber Identity Module (SIM) card) 1624. According to an embodiment of the present disclosure, the cellular module 1621 may perform at least some of the functions that the processor 1610 may provide. According to an embodiment of the present disclosure, the cellular module 1621 may include a CP. According to some embodiments of the present disclosure, at least some (e.g., two or more) of the cellular module 1621, the Wi-Fi module 1623, the BT module 1625, the GNSS module 1627, and the NFC module 1628 may be included in one Integrated Chip (IC) or IC package. The RF module 1629 may transmit and receive, for example, communication signals (e.g., RF signals). The RF module 1629 may include, for example, a transceiver, a Power Amplifier Module (PAM), a frequency filter, a Low Noise Amplifier (LNA), and an antenna. According to another embodiment of the present disclosure, at least one of the cellular module 1621, the Wi-Fi module 1623, the BT module 1625, the GNSS module 1627, and the NFC module 1628 may transmit and receive RF signals through a separate RF module. The subscriber identification module 1624 may include, for example, a card including a subscriber identity module or an embedded SIM, and may contain unique identification information (e.g., an Integrated Circuit Card Identifier (ICCID)) or subscriber information (e.g., an International Mobile Subscriber Identity (IMSI)).

The memory 1630 (e.g., the memory 130) may include, for example, an internal memory 1632 or an external memory 1634. The internal memory 1632 may include at least one of, for example, a volatile memory (e.g., a Dynamic Random Access Memory (DRAM), a Static RAM (SRAM), a Synchronous DRAM (SDRAM), etc.); and a non-volatile memory (e.g., a One Time Programmable Read-Only Memory (OTPROM), a Programmable ROM (PROM), an Erasable and Programmable ROM (EPROM), an Electrically Erasable and Programmable ROM (EEPROM), a mask ROM, a flash ROM, a flash memory, a hard drive, and a Solid State Drive (SSD)). The external memory 1634 may include a flash drive, for example, a Compact Flash (CF), a Secure Digital (SD), a Micro-Secure Digital (Micro-SD), a Mini-Secure Digital (Mini-SD), an extreme Digital (xD), a Multi-Media Card (MMC), a memory stick, or the like. The external memory 1634 may be functionally or physically connected to the electronic device 1601 through various interfaces.

For example, the sensor module 1640 may measure a physical quantity or may detect an operation state of the electronic device 1601, and may convert the measured physical quantity or the detected operation state into an electrical signal. The sensor module 1640 may include at least one of, for example, a gesture sensor 1640A, a gyro sensor 1640B, an atmospheric pressure sensor 1640C, a magnetic sensor 1640D, an acceleration sensor 1640E, a grip sensor 1640F, a proximity sensor 1640G, a color sensor 1640H (e.g., a Red-Green-Blue "RGB" sensor), a biometric sensor 1640I, a temperature/humidity sensor 1640J, an illuminance sensor 1640K, and an Ultraviolet (UV) sensor 1640M. Additionally or alternatively, the sensor module 1640 may include, for example, an E-nose sensor, an electromyography (EMG) sensor, an electroencephalogram (EEG) sensor, an electrocardiogram (ECG) sensor, an Infrared (IR) sensor, an iris sensor, and/or a fingerprint sensor. The sensor module 1640 may further include a control circuit for controlling one or more sensors included therein. In some embodiments of the present disclosure, the electronic device 1601 may further include a processor configured to control the sensor module 1640 as a part of or separately from the processor 1610, and may control the sensor module 1640 while the processor 1610 is in a sleep state.

The input apparatus 1650 may include, for example, a touch panel 1652, a (digital) pen sensor 1654, a key 1656, and an ultrasonic input unit 1658. The touch panel 1652 may use at least one of, for example, a capacitive scheme, a resistive scheme, an infrared scheme, and a surface acoustic wave scheme. Also, the touch panel 1652 may further include a control circuit. The touch panel 1652 may further include a tactile layer and may provide a tactile reaction to the user. The (digital) pen sensor 1654 may include, for example, a recognition sheet that is a part of the touch panel or is separated from the touch panel. The key 1656 may be, for example, a physical button, an optical key, and a keypad. The ultrasonic input unit 1658 may sense an ultrasonic wave generated by an input means through a microphone (e.g., a microphone 1688), and may confirm data corresponding to the sensed ultrasonic wave.

The display 1660 (e.g., the display 160) may include a panel 1662, a hologram unit 1664, a projector 1666, and/or a control circuit for controlling the same. The panel 1662 may be implemented to be, for example, flexible, transparent, or wearable. The panel 1662 together with the touch panel 1652 may be implemented as one or more modules. According to an embodiment of the present disclosure, the panel 1662 may include a pressure sensor (or a force sensor) capable of measuring the strength of pressure of a user's touch. The pressure sensor and the touch panel 1652 may be integrated into one unit, or the pressure sensor may be implemented as one or more sensors separated from the touch panel 1652. The hologram unit 1664 may display a three-dimensional image in the air by using the interference of light. The projector 1666 may display an image by projecting light onto a screen. The screen may be located, for example, inside or outside the electronic device 1601. The interface 1670 may include, for example, a High-Definition Multimedia Interface (HDMI) 1672, a Universal Serial Bus (USB) 1674, an optical interface 1676, and a D-subminiature (D-sub) 1678. The interface 1670 may be included in, for example, the communication interface 170 illustrated in FIG. 1. Additionally or alternatively, the interface 1670 may include, for example, a Mobile High-definition Link (MHL) interface, a Secure Digital (SD) card/Multi-Media Card (MMC) interface, or an Infrared Data Association (IrDA) standard interface.

For example, the audio module 1680 may bidirectionally convert between a sound and an electrical signal. At least some elements of the audio module 1680 may be included in, for example, the input/output interface 150 illustrated in FIG. 1. The audio module 1680 may process sound information which is input or output through, for example, a speaker 1682, a receiver 1684, an earphone 1686, the microphone 1688, or the like. The camera module 1691 is, for example, a device capable of capturing a still image and a moving image. According to an embodiment of the present disclosure, the camera module 1691 may include one or more image sensors (e.g., a front sensor or a back sensor), a lens, an Image Signal Processor (ISP), and a flash (e.g., an LED, a xenon lamp, or the like). The power management module 1695 may manage, for example, power of the electronic device 1601. According to an embodiment of the present disclosure, the power management module 1695 may include a Power Management Integrated Circuit (PMIC), a charger IC, or a battery or fuel gauge. The PMIC may use a wired and/or wireless charging method. Examples of the wireless charging method may include, for example, a magnetic resonance method, a magnetic induction method, an electromagnetic method, and the like. The PMIC may further include additional circuits (e.g., a coil loop, a resonant circuit, a rectifier, etc.) for wireless charging. The battery gauge may measure, for example, a residual quantity of the battery 1696, and a voltage, a current, or a temperature during charging. The battery 1696 may include, for example, a rechargeable battery and/or a solar battery.

The indicator 1697 may display a particular state (e.g., a booting state, a message state, a charging state, or the like) of the electronic device 1601 or a part (e.g., the processor 1610) of the electronic device 1601. The motor 1698 may convert an electrical signal into a mechanical vibration, and may generate a vibration, a haptic effect, or the like. The electronic device 1601 may include, for example, a mobile television (TV) support unit (e.g., a GPU) that may process media data according to a standard, such as Digital Multimedia Broadcasting (DMB), Digital Video Broadcasting (DVB), or mediaFLO™. Each of the above-described elements of hardware according to the present disclosure may include one or more components, and the names of the corresponding elements may vary based on the type of electronic device. In various embodiments of the present disclosure, the electronic device (e.g., the electronic device 1601) may omit some elements or may further include additional elements, or some of the elements of the electronic device may be combined into one entity, which may perform functions identical to those of the relevant elements before the combination thereof.

Figure 17:
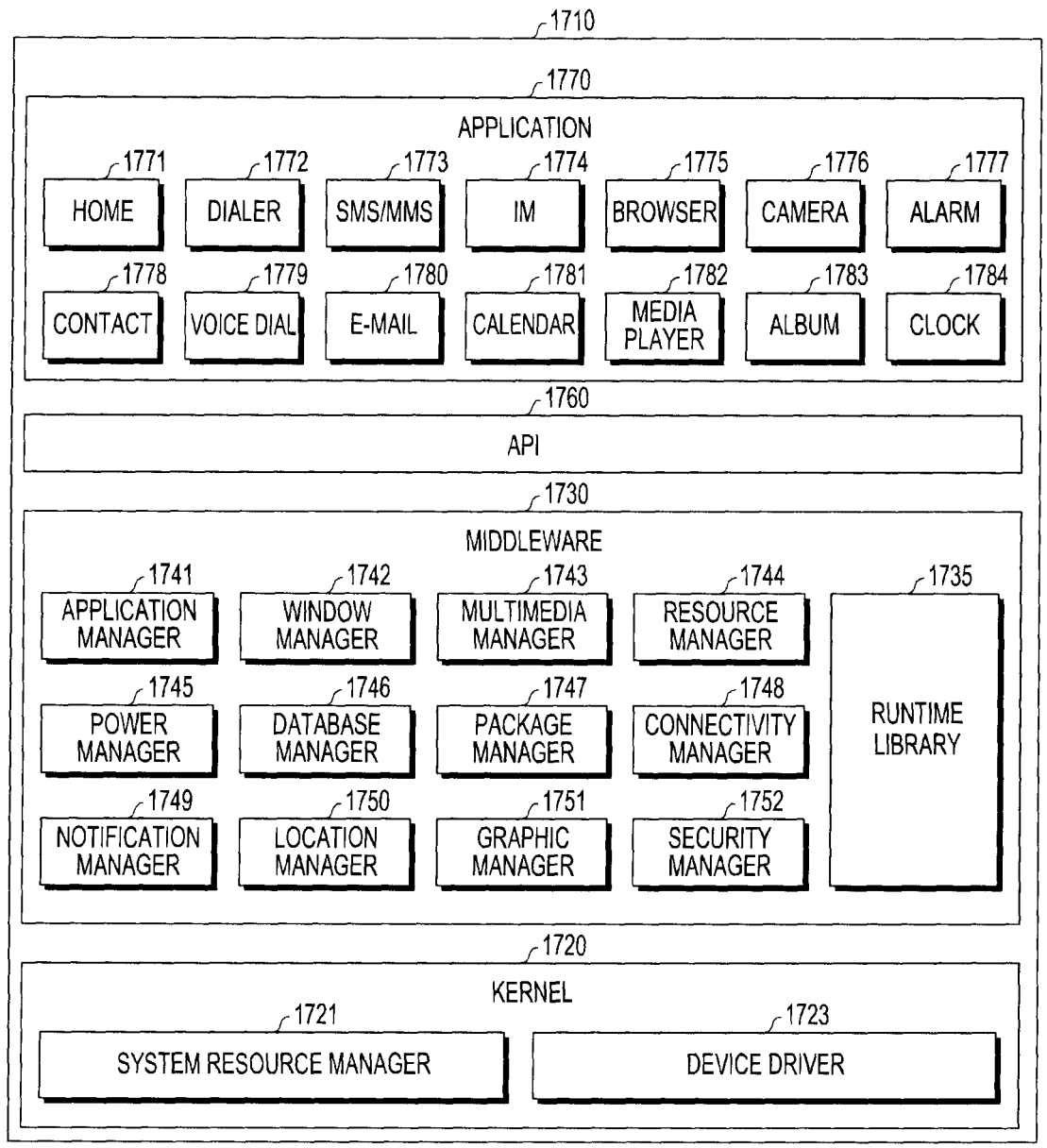
FIG. 17 is a block diagram illustrating a configuration of a program module according to various embodiments of the present disclosure.

FIG. 17 is a block diagram illustrating a configuration of a program module according to various embodiments of the present disclosure.

According to an embodiment of the present disclosure, the program module 1710 (e.g., the program 140) may include an OS for controlling resources related to the electronic device (e.g., the electronic device 101) and/or various applications (e.g., the application programs 147) executed in the OS. The OS may be, for example, Android™, iOS™, Windows™, Symbian™, Tizen™, and Bada™. Referring to FIG. 17, the program module 1710 may include a kernel 1720 (e.g., the kernel 141), middleware 1730 (e.g., the middleware 143), an API 1760 (e.g., the API 145), and/or an application 1770 (e.g., the application program 147). At least part of the program module 1710 may be preloaded on the electronic device, or may be downloaded from an external electronic device (e.g., the electronic device 102 or 104, or the server 106).

The kernel 1720 may include, for example, a system resource manager 1721 and/or a device driver 1723. The system resource manager 1721 may control, allocate, or retrieve system resources. According to an embodiment of the present disclosure, the system resource manager 1721 may include a process manager, a memory manager, or a file system manager. The device driver 1723 may include, for example, a display driver, a camera driver, a Bluetooth driver, a shared memory driver, a USB driver, a keypad driver, a Wi-Fi driver, an audio driver, or an Inter-Process Communication (IPC) driver. For example, the middleware 1730 may provide a function utilized in common by the applications 1770, or may provide various functions to the applications 1770 through the API 1760 so as to enable the applications 1770 to use the limited system resources within the electronic device. According to an embodiment of the present disclosure, the middleware 1730 may include at least one of a runtime library 1735, an application manager 1741, a window manager 1742, a multimedia manager 1743, a resource manager 1744, a power manager 1745, a database manager 1746, a package manager 1747, a connectivity manager 1748, a notification manager 1749, a location manager 1750, a graphic manager 1751, and a security manager 1752.

The runtime library 1735 may include, for example, a library module that a complier uses to add a new function by using a programming language during the execution of the application 1770. The runtime library 1735 may manage input/output, manage a memory, or process an arithmetic function. The application manager 1741 may manage, for example, the life cycle of the application 1770. The window manager 1742 may manage Graphical User Interface (GUI) resources used on the screen. The multimedia manager 1743 may determine formats utilized to reproduce media files, and may encode or decode a media file by using a coder/decoder (codec) appropriate for the relevant format. The resource manager 1744 may manage a source code of the application 1770 or a space in a memory. For example, the power manager 1745 may manage the capacity of a battery or power, and may provide power information utilized for an operation of the electronic device. According to an embodiment of the present disclosure, the power manager 1745 may operate in conjunction with a Basic Input/Output System (BIOS). The database manager 1746 may, for example, generate, search, or change a database to be used by the application 1770. The package manager 1747 may manage the installation or update of an application distributed in the form of a package file.

The connectivity manager 1748 may manage, for example, a wireless connection. The notification manager 1749 may provide a user with an event, such as an arrival message, an appointment, a proximity notification, and the like. The location manager 1750 may manage, for example, location information of the electronic device. For example, the graphic manager 1751 may manage a graphic effect, which is to be provided to the user, or a user interface related to the graphic effect. The security manager 1752 may provide, for example, system security or user authentication. According to an embodiment of the present disclosure, the middleware 1730 may include a telephony manager for managing a voice call function or a video call function of the electronic device, or may include a middleware module capable of forming a combination of functions of the above-described elements. According to an embodiment of the present disclosure, the middleware 1730 may provide a module specialized for each type of OS. The middleware 1730 may dynamically delete some of the existing elements, or may add new elements. The API 1760 is, for example, a set of API programming functions, and may be provided with a different configuration for each OS. For example, in the case of Android or iOS, one API set may be provided for each platform, and in the case of Tizen, two or more API sets may be provided for each platform.

The application 1770 may include, for example, a home 1771, a dialer 1772, an SMS/MMS 1773, an Instant Message (IM) 1774, a browser 1775, a camera 1776, an alarm 1777, a contact 1778, a voice dialer 1779, an email 1780, a calendar 1781, a media player 1782, an album 1783, a watch 1784, a health care application (e.g., which measures an exercise quantity, a blood sugar level, or the like), and an application for providing environmental information (e.g., information on atmospheric pressure, humidity, or temperature). According to an embodiment of the present disclosure, the application 1770 may include an information exchange application capable of supporting information exchange between the electronic device and an external electronic device. The information exchange application may include, for example, a notification relay application for delivering particular information to an external electronic device or a device management application for managing an external electronic device. For example, the notification relay application may deliver, to an external electronic device, notification information generated by the other applications of the electronic device, or may receive notification information from an external electronic device and may provide the received notification information to the user. The device management application may install, delete, or update, for example, a function (e.g., turning on/off an external electronic device itself (or some elements thereof) or adjusting the brightness (or resolution) of the display) of the external electronic device communicating with the electronic device, or an application executed by the external electronic device. According to an embodiment of the present disclosure, the application 1770 may include an application (e.g., a health care application of a mobile medical device) designated according to an attribute of an external electronic device. According to an embodiment of the present disclosure, the application 1770 may include an application received from an external electronic device. At least part of the program module 1710 may be implemented (e.g., executed) in software, firmware, hardware (e.g., the processor 310), or a combination of at least two thereof, and may include a module, a program, a routine, a set of instructions, or a process for performing one or more functions.

The term "module" as used herein may include a unit implemented in hardware, software, or firmware, and for example, may be used interchangeably with the term "logic", "logical block", "component", "circuit", or the like. The "module" may be an integrated component, or a minimum unit for performing one or more functions or a part thereof. The "module" may be mechanically or electronically implemented, and may include, for example, an Application-Specific Integrated Circuit (ASIC) chip, a Field-Programmable Gate Array (FPGA), or a programmable logic device which performs certain operations and is already known or is to be developed in the future. At least part of the device (e.g., modules or functions thereof) or the method (e.g., operations) according to various embodiments of the present disclosure may be implemented by an instruction which is stored in a computer-readable storage medium (e.g., the memory 130) in the form of a program module. When the instruction is executed by a processor (e.g., the processor 120), the processor may perform a function corresponding to the instruction. Examples of the computer-readable recoding medium may include: magnetic media, such as a hard disk, a floppy disk, and a magnetic tape; optical media, such as a Compact Disc Read Only Memory (CD-ROM) and a Digital Versatile Disc (DVD); magneto-optical media, such as a floptical disk; an internal memory; and the like. The instructions may include a code made by a compiler or a code which can be executed by an interpreter. The module or program module according to various embodiments of the present disclosure may include at least one of the aforementioned elements, may further include other elements, or some of the aforementioned elements may be omitted. Operations executed by the module, program module, or other elements according to various embodiments of the present disclosure may be executed sequentially, in parallel, repeatedly, or in a heuristic manner. Alternatively, at least some operations may be executed in a different order or may be omitted, or other operations may be added.

According to various embodiments of the present disclosure, in a computer-readable recording medium recording a program for executing on a computer, the program may include executable instructions that, when executed by a processor, cause the processor to perform operations including: displaying a user interface for a second purchase of a first product on at least a part of a display by using first purchase history information and/or first settlement information on the first product through a website stored in a memory of an electronic device; receiving a user input related to the user interface; performing settlement for the second purchase in response to the received user input; and storing, in the memory, second purchase history information and second settlement information related to the second purchase.

Example embodiments of the present disclosure are provided to describe technical contents of the present disclosure and to help the understanding of the present disclosure, and do not limit the present disclosure. Therefore, the present disclosure should be construed as including all modifications or various other embodiments which are based on the technical idea of the present disclosure.

What is claimed is:

1. An electronic device comprising:
   a display;
   a memory; and
   a processor electrically coupled to the display and the memory, configured to:
      control the display to display a first settlement screen for completing a first purchase of a first product;
      in response to receiving an input to the first settlement screen, transmit a request to execute the first purchase of the first product to an external server;
      store in the memory first electronic purchase history information recording the first purchase of the first product, and first settlement information associated with the first purchase;
      based on a request for a second purchase of the first product, control the display to display a user interface including a second settlement screen for the second purchase of the first product that is configured using at least one of the first electronic purchase history information and the first settlement information;
      in response to receiving an input to the second settlement screen, transmit a request to execute the second purchase of the first product to the external server; and
      store, in the memory, second electronic purchase history information and second settlement information corresponding to the second purchase,
   wherein the first settlement screen includes a first settlement storage icon and the first settlement information is stored in the memory when the first settlement storage icon is selected, and
   wherein the second settlement screen includes a second settlement storage icon such that the second electronic purchase history information and the second settlement information are stored in the memory when the second settlement storage icon is selected.

2. The electronic device of claim 1, wherein the user interface further comprises a purchase history information screen including the first electronic purchase history information and a plurality of icons each representing a completed transaction, and
   wherein the plurality of icons further includes a first icon representing a product purchased via electronic transaction with a first external server, and a second icon representing a product purchased via transaction with a second external server.

3. The electronic device of claim 2, wherein the processor is further configured to:
   identify whether updates exist for products indicated in the first electronic purchase history information stored in the memory; and
   if the updates exist, alter display of the purchase history information screen to reflect the updates.

4. The electronic device of claim 3, wherein the processor is configured to:
   retrieve from an external server a related product when the updates indicate that the first product displayed within the purchase history information screen is unavailable for purchase;
   in response to detecting selection of the related product, display a third settlement screen including the first settlement information; and
   in response to receiving a settlement request command to the third settlement screen, transmit a request to execute purchase of the related product to the external server, storing third settlement information for the purchase of the related product, and deleting the first settlement information corresponding to the first product from the memory.

5. The electronic device of claim 1, wherein the processor is further configured to:
   in response to detecting a third request to purchase the first product, transmit stored authentication credentials to the external server to log-in to the external server,
   wherein the stored authentication credentials are included in the first settlement information.

6. The electronic device of claim 1, wherein the processor is further configured to:
   prior to storing the first electronic purchase history information and the first settlement information, transmit a settlement request for the first purchase to execute the first purchase of the first product to an external server and identify whether the first settlement information is stored in the memory,
   wherein storing the first settlement information in the memory is executed responsive to detecting both completion of the first purchase and receiving an input requesting storage of the first settlement information.

7. The electronic device as claimed in claim 1,
   wherein the first settlement information and the second settlement information each include at least one of:
   parameters for a settlement Application Program Interface (API),
   a uniform resource locator corresponding to the external server,
   user authentication credentials for automatic login to the external server,
   an update indicating whether the first product is available for purchase,
   an update indicating a third product related to the first product, and
   network information for establishing short-range wireless communication, including at least one of near-field communication (NFC) and BlueTooth communication.

8. The electronic device as claimed in claim 1, wherein selection of the first product for the second purchase is executed using the Internet of Things (IoT).

9. The electronic device as claimed in claim 1, wherein the processor is further configured to:
   selection of the first product for the second purchase is detected via at least one of short-range wireless communication, an Augmented Reality (AR) service, or an image photographed by a camera of the electronic device.

10. A method in an electronic device, comprising:
   controlling a display of the electronic device to display a first settlement screen for completing a first purchase of a first product;
   in response to receiving an input to the first settlement screen, transmitting a request to execute the first purchase of the first product to an external server;
   storing in a memory first electronic purchase history information recording the first purchase of the first product, and first settlement information associated with the first purchase;

based on a request for a second purchase of the first product, controlling the display by a processor to display a user interface including a second settlement screen for the second purchase of the first product that is configured using at least one of the first electronic purchase history information and the first settlement information;

in response to receiving an input to the second settlement screen, transmitting by a communication module a request to execute the second purchase of the first product to the external server; and storing, in the memory, second electronic purchase history information and second settlement information corresponding to the second purchase, wherein the first settlement screen includes a first settlement storage icon and the first settlement information is stored in the memory when the first settlement storage icon is selected, and wherein the second settlement screen includes a second settlement storage icon such that the second electronic purchase history information and the second settlement information are stored in the memory when the second settlement storage icon is selected.

11. The method of claim 10, further comprising:
prior to storing the first electronic purchase history information and the first settlement information, transmitting a settlement request for the first purchase to execute the first purchase of the first product to an external server and identifying whether the first settlement information is stored in the memory, wherein storing the first settlement information in the memory is executed responsive to detecting both completion of the first purchase and receiving an input requesting storage of the first settlement information.

12. The method of claim 10, wherein the first settlement information and the second settlement information each include at least one of:
parameters for a settlement Application Program Interface (API);
a uniform resource locator corresponding to the external server;
user authentication credentials for automatic login to the external server;
an update indicating whether the first product is available for purchase;
an update indicating a third product related to the first product; and
network information for establishing short-range wireless communication, including at least one of near-field communication (NFC) and BlueTooth communication.

13. The method of claim 10, wherein the user interface further comprises a purchase history information screen including the first electronic purchase history information and a plurality of icons each representing a completed transaction, and
wherein the plurality of icons further includes a first icon representing a product purchased via electronic transaction with a first external server, and a second icon representing a product purchased via transaction with a second external server.

14. The method of claim 13, further comprising:
detecting whether updates exist for products indicated in the first electronic purchase history stored in the memory; and
if the updates exist, altering display of the purchase history information screen to reflect the updates.

15. The method of claim 14, further comprising:
retrieving from the external server a related product when the updates indicate that the first product displayed within the purchase history information screen is unavailable for purchase;
in response to detecting selection of the related product, displaying a third settlement screen including the first settlement information; and
in response to receiving a settlement request command to the third settlement screen, transmitting a request to execute purchase of the related product to the external server, storing third settlement information for the purchase of the related product, and deleting the first settlement information corresponding to the first product from the memory.

16. The method of claim 10, further comprising:
in response to detecting a third request to purchase the first product, transmit stored authentication credentials to the external server to log-in to the external server,
wherein the stored authentication credentials are included in the first settlement information.

17. The method of claim 10, wherein selection of the first product for the second purchase is detected via at least one of short-range wireless communication, an Augmented Reality (AR) service, or an image photographed by a camera of the electronic device.

18. A non-transitory computer-readable recording medium recording a program comprising instructions executable by a processor to cause the processor to perform operations comprising:
controlling a display of an electronic device to display a first settlement screen for completing a first purchase of a first product;
in response to receiving an input to the first settlement screen, transmitting a request to execute the first purchase of the first product to an external server;
storing in a memory first electronic purchase history information recording the first purchase of the first product, and first settlement information associated with the first purchase;
based on a request for a second purchase of the first product, controlling the display by a processor to display a user interface including a second settlement screen for the second purchase of the first product that is configured using at least one of the first electronic purchase history information and the first settlement information;
in response to receiving an input to the second settlement screen, transmitting by a communication module a request to execute the second purchase of the first product to the external server; and
storing, in the memory, second electronic purchase history information and second settlement information corresponding to the second purchase,
wherein the first settlement screen includes a first settlement storage icon and the first settlement information is stored in the memory when the first settlement storage icon is selected, and
wherein the second settlement screen includes a second settlement storage icon such that the second electronic purchase history information and the second settlement information are stored in the memory when the second settlement storage icon is selected.

* * * * *